US012699557B2

(12) United States Patent
Mandal et al.

(10) Patent No.: US 12,699,557 B2
(45) Date of Patent: Aug. 4, 2026

(54) AUTOMATED SYSTEM FOR PREDICTING SOFTWARE APPLICATION FRAMEWORK DEPLOYMENT CHANGES FOR INCIDENT MITIGATION

(71) Applicant: ATLASSIAN PTY LTD., Sydney (AU)

(72) Inventors: Atri Mandal, Bengaluru (IN); Mayank Sawhney, Bengaluru (IN); Prateek Mandloi, Bengaluru (IN); Jason D Cruz, Melbourne (AU)

(73) Assignee: ATLASSIAN PTY LTD., Sydney (AU)

( * ) Notice: Subject to any disclaimer, the term of this patent is extended or adjusted under 35 U.S.C. 154(b) by 278 days.

(21) Appl. No.: 18/620,616

(22) Filed: Mar. 28, 2024

(65) Prior Publication Data

US 2025/0306884 A1    Oct. 2, 2025

(51) Int. Cl.
G06F 8/60        (2018.01)
G06F 16/2457     (2019.01)

(52) U.S. Cl.
CPC .......... G06F 8/60 (2013.01); G06F 16/24578 (2019.01)

(58) Field of Classification Search
None
See application file for complete search history.

(56) References Cited

U.S. PATENT DOCUMENTS

| | | | |
|---|---|---|---|
| 8,135,775 B1 | 3/2012 | Anderson et al. | |
| 11,093,819 B1 | 8/2021 | Li et al. | |

| | | | |
|---|---|---|---|
| 2013/0254209 A1 | 9/2013 | Kang | |
| 2018/0275970 A1* | 9/2018 | Woulfe ..................... | G06F 8/70 |
| 2020/0153925 A1 | 5/2020 | Agarwal et al. | |
| 2023/0094373 A1* | 3/2023 | Muralidharan ....... | G06F 11/327 |
| | | | 714/38.1 |
| 2023/0104983 A1* | 4/2023 | Mandal .................. | G06N 20/00 |
| | | | 702/186 |
| 2023/0267033 A1* | 8/2023 | Mandal .................. | G06N 5/022 |
| 2024/0296310 A1 | 9/2024 | Hajiahmadifoomani et al. | |

(Continued)

OTHER PUBLICATIONS

Wang, "Understanding and predicting incident mitigation time", 2022, Information and Software Technology 155 (2023) 107119 (Year: 2022).*

(Continued)

*Primary Examiner* — Hossain M Morshed
(74) *Attorney, Agent, or Firm* — Alston & Bird LLP

(57)        ABSTRACT

Automated system for predicting software application framework deployment changes for incident mitigation is provided. An incident indication for an incident may be received. One or more incident features associated with the incident may be extracted. One or more data objects associated with the incident may be identified based on the one or more incident features. Candidate incident mitigation dataset comprising a plurality of incident mitigating predictions may be generated based on relation data and a topology graph structure associated with the one or more data objects. A ranked candidate incident mitigation dataset may be generated using one or more ranking models. One or more incident mitigating predictions from the ranked candidate incident mitigation dataset may be selected based on a rank value associated with each of the one or more incident mitigating predictions.

18 Claims, 9 Drawing Sheets

(56) References Cited

U.S. PATENT DOCUMENTS

| | | | |
|---|---|---|---|
| 2025/0077529 A1* | 3/2025 | Boxell | G06F 16/24578 |
| 2025/0111248 A1* | 4/2025 | Rao | G06N 5/022 |
| 2025/0231749 A1* | 7/2025 | Gupta | H04L 67/51 |
| 2025/0306884 A1* | 10/2025 | Mandal | G06F 16/24578 |
| 2025/0328329 A1* | 10/2025 | Mandal | G06F 8/60 |
| 2025/0328783 A1* | 10/2025 | Bokobza | G06F 16/285 |

OTHER PUBLICATIONS

Non-Final Rejection Mailed on Apr. 16, 2026 for U.S. Appl. No. 18/620,621, 15 page(s).

* cited by examiner

FEATURE EXTRACTION CIRCUITRY 212

INPUT/OUTPUT CIRCUITRY 206

RANKING CIRCUITRY 218

CONNECTED DATA CIRCUITRY 214

PROCESSOR 202

COMMUNICATIONS CIRCUITRY 208

INCIDENT MITIGATION MANAGEMENT CIRCUITRY 210

MEMORY 204

PREDICTION CIRCUITRY 216

200

700

702

RECEIVE INCIDENT INDICATION

704

EXTRACT ONE OR MORE INCIDENT FEATURES

706

IDENTIFY ONE OR MORE DATA OBJECTS

708

GENERATE CANDIDATE INCIDENT MITIGATION DATASET

710

GENERATE RANKED CANDIDATE INCIDENT MITIGATION DATASET

712

SELECT ONE OR MORE INCIDENT MITIGATION PREDICTIONS

714

CAUSE INCIDENT MITIGATION INTERFACE TO BE RENDERED ON A DISPLAY

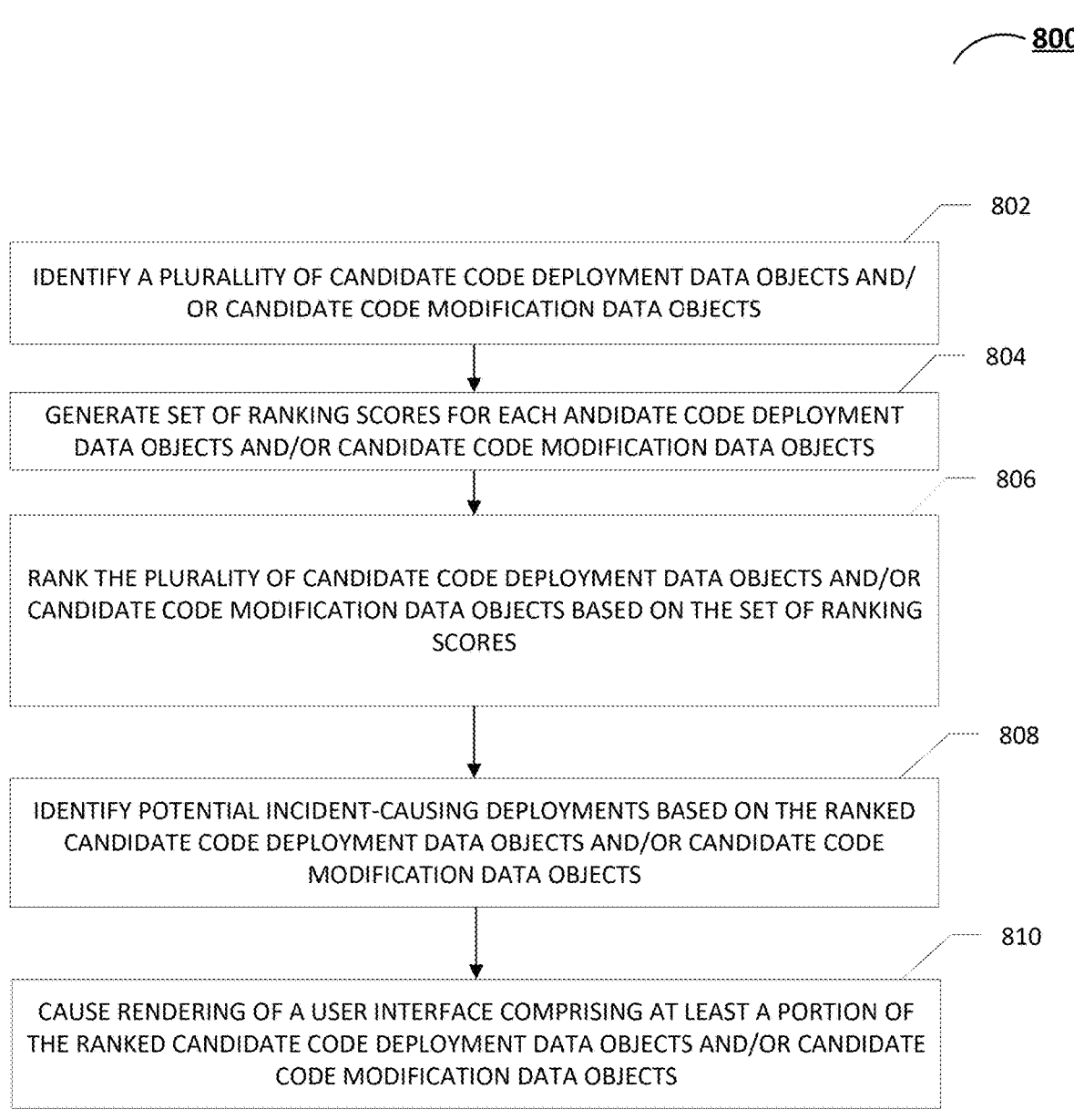

800

802

IDENTIFY A PLURALLITY OF CANDIDATE CODE DEPLOYMENT DATA OBJECTS AND/ OR CANDIDATE CODE MODIFICATION DATA OBJECTS

804

GENERATE SET OF RANKING SCORES FOR EACH ANDIDATE CODE DEPLOYMENT DATA OBJECTS AND/OR CANDIDATE CODE MODIFICATION DATA OBJECTS

806

RANK THE PLURALITY OF CANDIDATE CODE DEPLOYMENT DATA OBJECTS AND/OR CANDIDATE CODE MODIFICATION DATA OBJECTS BASED ON THE SET OF RANKING SCORES

808

IDENTIFY POTENTIAL INCIDENT-CAUSING DEPLOYMENTS BASED ON THE RANKED CANDIDATE CODE DEPLOYMENT DATA OBJECTS AND/OR CANDIDATE CODE MODIFICATION DATA OBJECTS

810

CAUSE RENDERING OF A USER INTERFACE COMPRISING AT LEAST A PORTION OF THE RANKED CANDIDATE CODE DEPLOYMENT DATA OBJECTS AND/OR CANDIDATE CODE MODIFICATION DATA OBJECTS

FIG. 8

AUTOMATED SYSTEM FOR PREDICTING SOFTWARE APPLICATION FRAMEWORK DEPLOYMENT CHANGES FOR INCIDENT MITIGATION

TECHNICAL FIELD

The present disclosure related generally to incident management; particularly to automated system for predicting software application framework deployment changes for incident mitigation.

BACKGROUND

Incident management is an essential aspect of software development and IT service management in a software application framework, particularly multi-layer service-oriented platforms. Applicant has identified many deficiencies and problems associated with incident management tools. Through applied effort, ingenuity, and innovation, these identified deficiencies and problems have been solved by developing solutions that are in accordance with the embodiments of the present invention, many examples of which are described in detail herein.

BRIEF SUMMARY

Embodiments of the present disclosure relate to automated system for predicting software application framework deployment changes for incident mitigation. In accordance with one aspect, an apparatus for generating incident mitigating predictions is provided, the apparatus comprising at least one processor and at least one memory including program code, the at least one memory and the program code configured to, with the at least one processor, cause the apparatus to at least receive an incident indication for an incident; extract one or more incident features associated with the incident; identify, based on the one or more incident features, one or more data objects associated with the incident; generate, based on relation data and a topology graph structure associated with the one or more data objects, candidate incident mitigation dataset comprising a plurality of incident mitigating predictions; generate, using one or more ranking models, a ranked candidate incident mitigation dataset; select one or more incident mitigating predictions from the ranked candidate incident mitigation dataset based on a rank value associated with each of the one or more incident mitigating predictions; and cause rendering of an incident mitigation interface to a user device display, wherein the incident mitigation interface comprises at least a portion of the one or more incident mitigating predictions selected.

In some embodiments, the one or more incident mitigating predictions selected comprises one or more code deployment modification recommendations.

In some embodiments, the one or more data objects comprise an affected service data object and one or more connected data objects.

In some embodiments, the at least one memory and the program code are configured to, with the at least one processor, to cause the apparatus to identify the one or more data objects by identifying, based on the one or more incident features, the affected service data object; and identifying, using a one or more machine learning models and based on the affected service data object, at least a portion of the one or more connected data objects.

In some embodiments, the at least one memory and the program code are configured to, with the at least one processor, to cause the apparatus to identify the one or more data objects by identifying, based on the one or more incident features, the affected service data object; and identifying, using a service dependency graph structure and based on the affected service data object, at least a portion of the one or more connected data objects.

In some embodiments, the at least one memory and the program code are further configured to, with the at least one processor, cause the apparatus to generate, using one or more machine learning models and based on the affected service data object and the one or more connected data objects, the relation data.

In some embodiments, the one or more ranking models comprise a learning-to-rank model.

In some embodiments, the at least one memory and the program code are configured to, with the at least one processor, cause the apparatus to generate the ranked candidate incident mitigation dataset based on user-generated content associated with the one or more data objects and using the learning-to-rank model.

In some embodiments, the at least one memory and the program code are configured to, with the at least one processor, cause the apparatus to further generate the ranked candidate incident mitigation dataset based on incident feedback received from a client computing device.

In some embodiments, the at least one memory and the program code are configured to, with the at least one processor, to cause the apparatus to extract the one or more incident features using a feature extraction model and based on an incident data object associated with the incident.

In accordance with another aspect, a computer-implemented method for generating incident mitigating predictions is provided, the computer-implemented method comprising receiving an incident mitigation request for an incident; extracting one or more incident features associated with the incident; identifying, based on the one or more incident features, one or more data objects associated with the incident; generating, based on relation data, topology graph structure, and historical service-related modifications associated with the one or more data objects, candidate incident mitigation dataset comprising a plurality of incident mitigating predictions; generating, using one or more ranking models, a ranked candidate incident mitigation dataset; selecting one or more incident mitigating predictions from the ranked candidate incident mitigation dataset based on a rank value associated with each of the one or more incident mitigating predictions; and causing rendering of an incident mitigation interface to a user device display, wherein the incident mitigation interface comprises at least a portion of the one or more incident mitigating predictions selected.

In some embodiments, the one or more incident mitigating predictions selected comprises one or more code deployment modification recommendations.

In some embodiments, the one or more data objects comprise an affected service data object and one or more connected data objects.

In some embodiments, identifying the one or more data objects comprises identifying, based on the one or more incident features, the affected service data object; and identifying, using a one or more machine learning models and based on the affected service data object, at least a portion of the one or more connected data objects.

In some embodiments, identifying the one or more data objects comprises identifying, based on the one or more incident features, the affected service data object; and identifying, using a service dependency graph structure and based on the affected service data object, at least a portion of the one or more connected data objects.

In some embodiments, the computer-implemented method further comprise generating, using one or more machine learning models and based on the affected service data object and the one or more connected data objects, the relation data.

In some embodiments, the one or more ranking models comprise a learning-to-rank model.

In some embodiments, generating the ranked candidate incident mitigation dataset further comprises generated the ranked candidate incident mitigation dataset based on user-generated content associated with the one or more data objects and using the learning-to-rank model.

In some embodiments, generating the ranked candidate incident mitigation dataset further comprises generating the ranked candidate incident mitigation dataset based on incident feedback received from a client computing device.

In accordance with another aspect at least one non-transitory computer-readable storage medium for generating incident mitigating predictions is provided, the at least one non-transitory computer-readable storage medium having computer coded instructions configured to, when executed by at least one processor receive an incident indication for an incident; identify, based on the one or more incident features of the incident, one or more data objects associated with the incident; generate, based on topology graph structure and historical service-related modifications associated with the one or more data objects, candidate incident mitigation dataset comprising a plurality of incident mitigating predictions; generate, using a learning-to-rank-model, a ranked candidate incident mitigation dataset; select one or more incident mitigating predictions from the ranked candidate incident mitigation dataset based on a rank value associated with each of the one or more incident mitigating predictions; and cause rendering of an incident mitigation interface to a user device display, wherein the incident mitigation interface comprises at least a portion of the one or more incident mitigating predictions selected.

BRIEF DESCRIPTION OF THE SEVERAL VIEW OF THE DRAWINGS

Having thus described some embodiments in general terms, references will now be made to the accompanying drawings, which are not drawn to scale, and wherein:

FIG. 8 is a flowchart diagram of an example process for identifying potential incident-causing deployments in accordance with some embodiments of the present disclosure.

DETAILED DESCRIPTION OF SOME EMBODIMENTS

Figure 1:
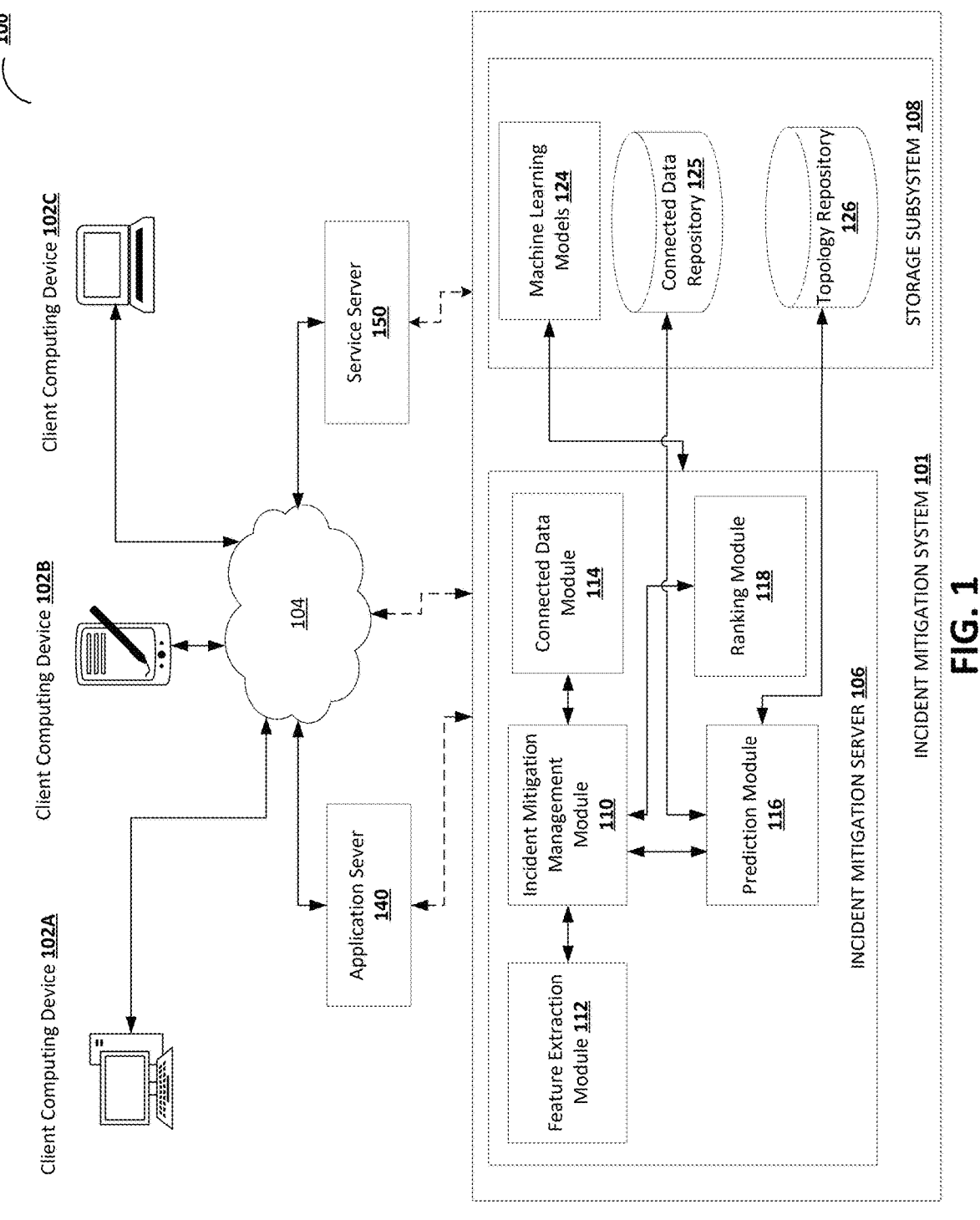
FIG. 1 is a block diagram of an example system architecture within which at least some embodiments of the present disclosure may operate.

Various embodiments of the present disclosure now will be described more fully hereinafter with reference to the accompanying drawings, in which some, but not all embodiments of the disclosure are shown. Indeed, this disclosure may be embodied in many different forms and should not be construed as limited to the embodiments set forth herein; rather, these embodiments are provided so that this disclosure will satisfy applicable legal requirements. The term "or" (also designated as "/") is used herein in both the alternative and conjunctive sense, unless otherwise indicated. The terms "illustrative" and "exemplary" are used to be examples with no indication of quality level. Like numbers may refer to like elements throughout. The phrases "in one embodiment," "according to one embodiment," and/or the like generally mean that the particular feature, structure, or characteristic following the phrase may be included in at least one embodiment of the present disclosure and may be included in more than one embodiment of the present disclosure (importantly, such phrases do not necessarily refer to the same embodiment).

Overview

Some embodiments of the present disclosure address technical problems associated with incident mitigation in a large multi-layer service-oriented platform involving inter-dependent services and microservices that support a myriad of software features, applications, and software development functions. Indeed, some large multi-layer service-oriented platforms may be comprised of topologies of 1,500 or more interdependent services and microservices. Such multi-layer service-oriented platforms are nimble, highly configurable, and enable robust collaboration and communication between users at the individual, team, and enterprise level.

Computing devices operating on, or otherwise supporting, such multi-layer service-oriented platforms routinely generate, transmit, and store millions of data objects. As they do so, some data objects or associated operations may trigger alerts and/or more serious incidents that are tracked and monitored by information technology service management (ITSM) software applications such as Jira Service Management (JSM) by Atlassian, Inc. Given the complexity of large multi-layer service-oriented platforms, it can be difficult to understand potential causes and possible solutions or mitigation operations. This difficulty is exacerbated when one considers that code deployments among the multitude of interdependent services and microservices are in constant flux as updates occur and new or improved features are released.

According to various embodiments, there is provided a system, method, apparatus, and/or a computer program that is configured to assess incidents in the context of a multi-layer service-oriented platform and programmatically infer and recommend mitigating changes. Notably, such mitigating changes may include programmatically determined changes to software code and code deployments that are deemed related to or which appear to be a potential cause of a selected incident.

According to various embodiments, the recommended incident-mitigating code modifications and deployments may be achieved at least in part by correlating data/information across various software platforms (e.g., Jira Service Management (JSM), Jira Work Management (JWM), and/or the like). In some embodiments, service dependency graphs, project to service maps (e.g., connected project and service data) including cross-platform linkages (e.g., JSW linkages), change to service maps (e.g., prior changes made to services/microservices) and deployment to service maps (e.g., prior service deployments/microservice deployments) may be leveraged to obtain the noted data/information.

Example embodiments receive an incident indication associated with an incident, extract one or more incident features associated with the incident, identify data objects associated with the incident, generate a candidate incident mitigation dataset that includes a plurality of incident mitigating predictions, generate a ranked candidate incident mitigation dataset, select one or more incident mitigating predictions from the ranked candidate incident mitigation dataset, and cause an incident mitigation interface to be rendered on a display. In various embodiments, the candidate incident mitigation dataset comprises candidate code deployment data objects and/or candidate code modification deployment data objects. In various embodiments, the selected one or more incident mitigating predictions include incident-mitigating code modification recommendations and/or incident-mitigating code deployment modification recommendations. In some embodiments, the incident-mitigation code modification recommendations may comprise one or more code modification data objects and/or one or more code deployment data objects selected from a ranked candidate incident mitigation dataset comprising a ranked list of candidate code deployment data objects and/or candidate code modification data objects.

Example embodiments identify potential incident-causing deployments by ranking candidate code deployment data objects and/or candidate code modification data objects in the candidate incident mitigation dataset using a specially configured ranking framework. In some embodiments, the ranking framework includes programmatically generating a semantic similarity score for each candidate code deployment data object and/or candidate code modification data object in the candidate incident mitigation dataset, generating a topological distance score for each candidate code deployment data object and/or candidate code modification data object, and/or generating a temporal score for each candidate code deployment data object and/or candidate code modification data object, and ranking the candidate code deployment data objects and/or candidate code modification data objects based on the programmatically generated scores.

By automatically inferring and recommending incident-mitigating changes and/or deployments, which may include incident-mitigating code modification recommendations and incident-mitigating code deployment modification recommendations, example embodiments described herein provide improvements in various technology fields including, but not limited to, incident management and incident mitigation technology fields. Moreover, embodiments obviate the need for or reduced the amount of manual incident investigation, which in turn, reduces the time to resolution, minimizes repeat incident occurrence, improves efficiency, and improves computing resources usage efficiency. Further, by utilizing a ranking framework as described herein to identify potential incident-causing deployments by ranking candidate code deployment data objects and/or candidate code modification data objects, example embodiments described herein improve the accuracy of ranking and/or relevance systems as well as fault analysis systems.

Definitions

As used herein, the terms "data," "content," "digital content," "information," and similar terms may be used interchangeably to refer to data capable of being transmitted, received, and/or stored in accordance with embodiments of the present disclosure. Further, where a computing device is described herein to receive data from another computing device, it will be appreciated that the data may be received directly from another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data may be sent directly to another computing device or may be sent indirectly via one or more intermediary computing devices, such as, for example, one or more servers, relays, routers, network access points, base stations, hosts, and/or the like.

The term "computer-readable storage medium" refers to a non-transitory, physical or tangible storage medium (e.g., volatile or non-volatile memory), which may be differentiated from a "computer-readable transmission medium," which refers to an electromagnetic signal. Such a medium can take many forms, including, but not limited to a non-transitory computer-readable storage medium (e.g., non-volatile media, volatile media), and transmission media. Transmission media include, for example, coaxial cables, copper wire, fiber optic cables, and carrier waves that travel through space without wires or cables, such as acoustic waves and electromagnetic waves, including radio, optical, infrared waves, or the like. Signals include man-made, or naturally occurring, transient variations in amplitude, frequency, phase, polarization or other physical properties transmitted through the transmission media. Examples of non-transitory computer-readable media include a magnetic computer readable medium (e.g., a floppy disk, hard disk, magnetic tape, any other magnetic medium), an optical computer readable medium (e.g., a compact disc read only memory (CD-ROM), a digital versatile disc (DVD), a Blu-Ray disc, or the like), a random access memory (RAM), a programmable read only memory (PROM), an erasable programmable read only memory (EPROM), a FLASH-EPROM, or any other non-transitory medium from which a computer can read. The term computer-readable storage medium is used herein to refer to any computer-readable medium except transmission media. However, it will be appreciated that where embodiments are described to use a computer-readable storage medium, other types of computer-readable mediums can be substituted for or used in addition to the computer-readable storage medium in alternative embodiments.

The terms "client computing device," "computing device," "client computing entity" "network device," "computer," "user equipment," and similar terms may be used interchangeably to refer to a computer comprising at least one processor and at least one memory. In some embodiments, the client computing device may further comprise one or more of: a display device for rendering one or more of a graphical user interface (GUI), a vibration motor for a haptic output, a speaker for an audible output, a mouse, a keyboard or touch screen, a global position system (GPS) transmitter and receiver, a radio transmitter and receiver, a microphone, a camera, a biometric scanner (e.g., a fingerprint scanner, an eye scanner, a facial scanner, etc.), or the like. Additionally, the term "client computing device" may refer to computer hardware and/or software that is configured to access a service made available by a server. The server is often, but not always, on another computer system, in which case the client accesses the service by way of a network. Embodiments of client computing devices may include, without limitation, smartphones, tablet computers, laptop computers, personal computers, desktop computers, enterprise computers, and the like. Further non-limiting examples include wearable wireless devices such as those integrated within watches or smartwatches, eyewear, helmets, hats, clothing, earpieces with wireless connectivity, jewelry and so on, universal serial bus (USB) sticks with wireless capabilities, modem data cards, machine type devices or any combinations of these or the like.

The term "circuitry" refers to hardware-only circuit implementations (e.g., implementations in analog circuitry and/or digital circuitry); combinations of circuits and one or more computer program products that comprise software and/or firmware instructions stored on one or more computer readable memory devices that work together to cause an apparatus to perform one or more functions described herein; or integrated circuits, for example, a processor, a plurality of processors, a portion of a single processor, a multicore processor, that requires software or firmware for operation even if the software or firmware is not physically present. This definition of "circuitry" applies to all uses of this term herein, including in any claims. Additionally, the term "circuitry" may refer to purpose-built circuits fixed to one or more circuit boards, for example, a baseband integrated circuit, a cellular network device or other connectivity device (e.g., Wi-Fi card, Bluetooth circuit, etc.), a sound card, a video card, a motherboard, and/or other computing device.

The term "multi-layer service-oriented platform" refers to a complex network computing environment associated with a multitude of computing devices, applications, services, and microservices. For example, in some embodiments, a multi-later service-oriented platform includes dozens of applications that are supported by 1000+ services operating within a cloud based platform. Example multi-layer service-oriented platforms may comprise a federated network of computing devices, and/or a plurality of database platforms (e.g., servers, hard-drives, etc.). Applications and services or microservices of example multi-layer service-oriented platforms may be hosted by internal resources or external resources as further defined below. Multi-layer service-oriented platforms can include an application that is configured to generate and update a repository of collected information associated with each service (e.g., data classification labels associated with service generated outputs). Such multi-layer service-oriented platforms can support an application or multiple applications that are configured for the collection of information, in the form of application data objects, to at least capture, classify, and structure such application data objects.

The term "application" refers to a computer program or a group of computer programs designed for use by and interaction with one or more networked or remote computing devices. Examples of an application comprise workflow engines, service desk incident management, team collaboration suites, cloud services, word processors, spreadsheets, accounting applications, web browsers, e-mail clients, media players, file viewers, videogames, and photo/video editors. An application can be supported by one or more services either via direct communication with the service or indirectly by relying on a service that is in turn supported by one or more other services. For example, an application may transmit an application data object, that requests particular information be returned to the application, to a service, the service in response transmits a service data object, containing the requested information, to the application. In some embodiments, an application may be supported by an internal resource or an external resource as defined below.

The term "data object" refers to a data structure, associated with a value in a computer-readable storage medium and/or a computer-readable transmission medium, that represents content that is configured for use or display by one or more software applications, services, or microservices. The data object can take the structural form of a vector or other appropriate data structure for representing output data. The data object includes metadata and may be stored via computer-readable storage medium (e.g., with a repository associated with a server). The data object may be transmitted by a first service or software application and received by a second service or second software application by way of a computer-readable transmission medium (e.g., telecommunication signals, wired/wireless electrical signals, etc.). In some embodiments, a data object may comprise a plurality of other data objects. The data object may comprise one or more of a service data object, an application data object, a vector data object, an issue data object, a project data object, an incident data object, an alert data object, or the like. A service data object, for example, may comprise any data object generated, or at least partially configured, by one or more services. An application data object, for example, may comprise a data object generated, or at least partially configured, by one or more applications. Data objects comprise one or more data elements including, without limitation, metadata such as data object identifiers and origin identifiers as discussed below.

Data objects disclosed herein are structured to include a data object identifier that serves as a unique identifier for the data object as further discussed below. Data objects structured as discussed herein may further include an origin identifier that serves as a unique identifier for the application or service that generated, hosts, or manages the data object. Data objects structured as described herein may further include one or more text-based elements such as, for example, company name, username, password, message text, file text, or combinations thereof, and which are further defined below. In some embodiments, a data object can be a web service output provided by a server to a plurality of other computing devices over a wired and/or wireless network and, as such, the data object can contain one or more properties associated with the web service such as an IP address, API information, the like, or combinations thereof.

In some embodiments, data objects can be configured to follow a predefined format, such that an application can receive, manipulate, and/or store substantially similar data objects from a plurality of sources (e.g., applications, services, etc.). For example, an application may receive a plurality of data objects from a plurality of services, each service configured for the provision of particular functions. In such example embodiments, the application may be able to configure data objects in accordance with information received from a data classification system. For example, an application may be configured to sort data elements of a data object into a predefined order based on a particular data classification label, and/or access control configuration, received via the data classification system.

In some embodiments, a data object can be generated in accordance with instructions associated with one or more data classification systems (e.g., a data classification model and accuracy score threshold, etc.). In some embodiments, the data object may be one or more encrypted or unencrypted files, for example, JavaScript Object Notation (JSON) files, Extensible Markup Language (XML) files, Simple Object Access Protocol (SOAP) files, Hypertext Markup Language (HTML) files, the like, or combinations thereof. Data or metadata collected from each service, application, repository, or system user (e.g., developer, end-user, administrator, etc.) to be represented by an associated data object can be collected directly from the respective entity itself or a computing device associated with the entity (e.g., a hosting server, a user's computing device, etc.). In some embodiments, a data object may comprise a data object identifier and an attribute, the attribute comprising an array of name and value pairs with properties associated with one or more of a service, application, repository, or system user.

The term "data object identifier" refers to one or more data elements by which a data object may be uniquely identified. The data object identifier may include, for example, one or more of Internet Protocol (IP) addresses associated with an origination service, Uniform Resource Locators (URLs) associated with an origination service, numerical characters, alphabetical characters, alphanumeric codes, American Standard Code for Information Interchange (ASCII) characters, encryption keys, identification certificates, the like, or combinations thereof. In some embodiments, the data object identifier may include and/or point to, at least partially, one or more data classification labels associated with the data object based on the contents of the data object. The data object identifier may be randomly generated, pseudo randomly generated, time based, hardware based, or some combination thereof.

The term "origin identifier" refers to one or more data elements by which a service, external resource, application, or the like, which generated, transmitted, hosts, or manages an associated data object may be uniquely identified. The origin identifier may include, for example, one or more of Internet Protocol (IP) addresses, Uniform Resource Locators (URLs), numerical characters, alphabetical characters, alphanumeric codes, American Standard Code for Information Interchange (ASCII) characters, encryption keys, identification certificates, or the like. The origin identifier may be randomly generated, pseudo randomly generated, time based, hardware based, or some combination thereof. An example embodiment of an origin identifier includes data provided by at least an originating service (e.g., a service that generated a data object, etc.). For example, an origin identifier may comprise a URL associated with a service. In some embodiments, the origin identifier comprises a JSON formatted text that is either posted, by way of an HTTP POST, to a data object during creation or when a data object is returned from another service, through an HTTP GET.

The terms "data element," "features" or similar terms refer to a constituent component of a data object. In some embodiments, data elements may be grouped together according to a hierarchy within a data object. For example, a data object may comprise a string of words (e.g., a sentence, etc.) and each word of the string of words may define a respective data element. Further, each word of the string of words may comprise one or more letters which may each define a respective data element (e.g., an ASCII character code, etc.). Moreover, each ASCII character code, for example, may comprise a plurality of additional constituent data elements, such as, one or more binary codes (e.g., 0 or 1). In such embodiments, a binary character of 0 or 1 would define the smallest divisible data element of a data object. In some embodiments, a data element may comprise a text-based data element, a word-based data element, a time data element, a vector data element, a data object identifier, an origin identifier, all or some combination of these, as described in further detail below.

The term "service" refers to a computer program or a group of computer programs designed to provide a software functionality or a set of software functionalities via a multi-layer service-oriented platform. For example, a service may be configured to retrieve specified information or to execute a set of operations aimed at a particular purpose. Applications and/or client devices may be configured to use such services to execute their respective purposes, together with the policies that control service usage, for example, based on the identity of the client (e.g., an application, another service, etc.) requesting the service. Additionally, a service may support, or be supported by, at least one other service via a service dependency relationship. For example, a translation application stored on a smartphone may call a translation dictionary service at a server in order to translate a particular word or phrase between two languages. In such an example, the translation application is dependent on the translation dictionary service to perform the translation task. In some embodiments, a service is offered by one computing device over a network to one or more other computing devices. Services may be supported by internal resources or external resources as defined below. In some embodiments, services may be accessed by other services via a plurality of APIs, for example, JavaScript Object Notation (JSON), Extensible Markup Language (XML), Simple Object Access Protocol (SOAP), Hypertext Markup Language (HTML), the like, or combinations thereof. In some embodiments, services may be configured to capture or utilize database information and asynchronous communications via message queues (e.g., Event Bus). Non-limiting examples of services include an open source API definition format, an API logger, a network diagnostics tool, a geofencing service, a single sign-on enforcement service, an internal developer tool, web based HTTP services, databased services, asynchronous message queues which facilitate service-to-service communications, or the like. In some embodiments, a service can represent an operation with a specified outcome and can further be a self-contained software program. In some embodiments, a service from the perspective of the client (e.g., another service, application, etc.) can be a black box meaning that the client need not be aware of the service's inner workings. In some embodiments, a first service may transmit a service data object to one or more second services, and/or applications, via an API supported by communication circuitry. In some embodiments, a service may be an internal resource or an external resource.

The term "internal resource" refers to a software program, application, platform, or service that is configured by an organization (e.g., an enterprise owner of a multi-layer service-oriented platform) to provide functionality to another one or more of the software programs, applications, platforms, or services operating on a multi-layer service-oriented platform, either directly or indirectly, through one or more other services. Internal resources operate on a compiled code base and/or use data repositories that are at least partially shared by other software programs, applications, or services of the multi-layer service-oriented platform. In some embodiments, application code bases, service code bases, and code bases that support an internal resource are hosted on common servers or using computing devices operating within a common intranet or network.

The term "external resource" refers to a software program, application, platform, or service that is configured to communicate with applications, services, software programs, and/or devices of a multi-layer service-oriented platform but which operates on a compiled code base that is separate from code bases of the multi-layer service-oriented platform. In some embodiments, communications between an external resource and an application or service calling the external resource takes place through a firewall and/or other network security features of the multi-layer service-oriented platform. The external resource operates on a compiled code base or repository that is separate and distinct from that which supports the application or service of the multi-layer service-oriented platform calling the external resource.

The term "incident" refers to a data entity that describes an event that causes disruption to or a reduction in the quality of a service associated with a software application, a service, a software application feature, a network, and/or a device. In one example, an incident associated with a monitored software application may require an emergency response. In some embodiments, an incident is created based on alert data associated with one or more alerts and/or conditions for creating an incident. In some examples, an incident may be automatically created in response to the number of alerts associated with a particular service exceeding a threshold associated with a parameter/keyword for a period of time. An incident may be embodied as or otherwise associated with an incident data object which includes incident attributes that are extracted as incident features.

The terms "input," "indication," "indication input," "interaction," "interaction input," or the like refer to an identifiable, non-transitory occurrence that has technical significance for system hardware and/or software. In some embodiments, an interaction input may be user-generated via at least a user interface associated with a computing device, such as keystrokes, mouse movements, voice commands, and/or the like. In some embodiments, an interaction input may be application-generated (i.e., automatically and/or dynamically internally generated by an application via at least computing circuitry), such as program loading, compiling a data object, errors, and/or the like. For example, an application function may be caused by, and/or a data object may be generated in response to, a user interface interaction input and/or an internal confirmation interaction input generated by the application or associated computing device(s).

The term "incident indication" refers to signal, data, and/or computer readable instructions that triggers an incident mitigating process configured to generate one or more incident mitigating predictions with respect to an incident. For example, one or more incident mitigating predictions may be automatically generated for an incident in response to an incident indication. In some embodiments, an incident indication may be generated by an information technology service management (ITSM) software applications such as Jira Service Management (JSM) by Atlassian, Inc., a program associated or integrated with an ITSM, or directly associated with an ITSM. Alternatively or additionally, in some embodiments, an incident indication may be generated by an incident mitigation system configured to generate incident mitigating predictions. In some embodiments, an incident indication may comprise an incident mitigation request or may be generated in response to an incident mitigation request.

The term "incident mitigation request" refers to signal, data, and/or computer readable instructions received by one or more computing devices (e.g., incident mitigation server) that comprise, represents, indicates, and/or is associated with a request to generate one or more incident mitigating predictions for an incident. In some embodiments, an incident mitigation request may include an incident data object and/or an incident identifier associated with the incident. For example, an incident mitigation request may comprise an incident identifier associated with an incident and may be indicative of a request to generate one or more incident mitigating predictions for the incident. As another example, an incident mitigation request may comprise an incident data object (which may include an incident identifier) associated with the incident and which may be leveraged to identify the incident and/or other incident features. In some embodiments, the incident mitigation request may be generated in response to user engagement/interactions with an interface (e.g., an incident mitigation interface, incident management interface, or the like). For example, an incident mitigation system may receive an incident mitigation request originating from a client computing device associated with a user (e.g., alert manager, team member, team manager, and/or the like) in response to user engagement/interaction with the interface.

The term "incident data object" refers to a type of data object that includes one or more properties, attributes, and/or the like of an incident. For example, an incident may be embodied as or otherwise associated with an incident data object. In some embodiments, an incident data object includes a plurality of attribute data fields (e.g., incident attribute data fields) associated with the incident. Examples of attribute data fields of an incident data object include a message attribute data field that stores message data that indicates the basis of the incident creation, an entity attribute data field that is used to specify the domain that the incident is related to, such as name of the service, server, or application, a description attribute data field (e.g., incident description attribute data field) that is used to describe the incident, and/or the like The term "affected service data object" refers to a service data object associated with an incident. For example an affected service data object may comprise one of one or more service data objects, where collaboration between and/or among the one or more service data objects is faulty causing some feature of a software application associated with the one or more service data objects to be degraded.

The term "connected data object" refers to a data object that is related to, connected to, or otherwise associated directly or indirectly with an affected service data object. For example, a connected data object may describe a data object that has a relationship with an affected service data object. Examples of a connected data object include a project data object that is associated with an affected service data object, an issue data object that is associated with an affective service data object, a code deployment data object associated with an affected service data object, a code modification data object associated with an affected service data object, a service data object that is, indirectly or directly, connected or otherwise associated with an affected service data object, or the like (e.g., as determined based on connected data graph structure). In some embodiments, a connected data object may be determined using various techniques including, but not limited to, connected data graph structures, service dependency graph structures, machine learning models, a combination thereof and/or the like.

The term "incident identifier" refers to one or more items or elements by which an incident may be uniquely identified from other incidents. The incident identifier may be in the form of text string(s), numerical character(s), alphabetical character(s), alphanumeric code(s), American Standard Code for information Interchange (ASCII) characters(s), and/or the like. In some embodiments, an incident identifier may be extractable from an incident data object.

The term "incident feature" refers to a data entity that describes an incident attribute data field of an incident data object and/or an embedded representation of a natural language format field (e.g., an incident message field) of the incident data object. For example, incident features describes any data, object, detail, attribute, embedding transformation, or the like that is extracted from an incident data object by a feature extraction model for use by one or more modules of an incident mitigation system and/or or one or more machine learning models. Such incident features may include embedding or vector transformations of text (e.g., incident message components, problem descriptions, etc.), software identifiers, service or microservice identifiers, and other data or metadata that are configured for input into a machine learning model and/or leveraged by one or modules of an incident mitigation system to perform one or more stages of an incident mitigation process as described herein.

The term "alerts" refers to one or more monitored events or metrics, cautions, problems, errors, issues, flags, and/or incidents that are generated by an alert management system that is configured to monitor a software application framework. Alerts are embodied as any data construct and/or data object generated by an alert management system indicating the status and/or operating functionality of a component, module, service, microservice, feature, application, and/or device within a software application framework. Such operating functionality may include indicators regarding the performance of a component (e.g., whether the component and its functions are running at peak speed or slower than peak speed, if certain functions or capabilities are not running at peak performance or not running at all, etc.). Further, operating functionality may include security threats (e.g., unauthorized access, data breaches, etc.), compliance issues (e.g., violation of data privacy), system failures (e.g., application crash, server down, network connection lost, etc.). In some embodiments, an alert is embodied as or is associated with an alert data object which includes alert attributes that are extracted as alert features as defined herein.

The term "connected data graph structure" refers to a data structure configured to represent relationships between data objects including, but not limited to, relationships between service data objects, relationships between projects and service data objects, relationships between code modification data objects and service data objects, relationships between code deployment data objects and service data objects, relationships between code deployment data objects, relationships between code modification data objects, relationships between code deployment data objects and code modification data objects, and/or the like. A connected data graph structure may include project to service maps (e.g. which may include cross-platform linkages (e.g., JSW linkages)), change to service maps (e.g., prior changes made to services/microservices), deployment to service maps (e.g., prior service deployments/microservice deployments), or the like. For example, a connected data graph structure may comprise a plurality of data objects (e.g., service data object, project data object, code deployment data object, code modification data object, and/or the like) as well as relationship objects that represent networks of communication, data organization, computing devices, data exchanged, the like, or combinations thereof for the plurality of data objects. In some embodiments, data objects in a connected data graph structure are represented by nodes of the connected data graph structure. In some embodiments, relationship objects are represented by edges of the connected data graph structure. In some embodiments, a graphical representation of the connected data graph structure can be, at least partially, rendered via a graphical user interface. The connected data graph structure may comprise one or more weighted graphs, multigraphs, isomorphic graphs, trees, the like, or combinations thereof.

The term "relationship object" refers to a data structure representing a relationship between data objects (e.g., service data object, project data object, code deployment data object, code modification data object, and/or the like). In some embodiments, relationship objects may be leveraged to identify candidate code deployment data objects and/or candidate code modification data objects.

The term "service dependency graph structure" refers to a data structure configured to represent dependency relationships between an application and its associated services. For example, a service dependency graph structure may comprise service data objects and service object dependencies that represent networks of communication, data organization, computing devices, data exchanged, the like, or combinations thereof for a plurality of services relied on by an application. In some embodiments, service data objects are represented by nodes of the service dependency graph structure. In some embodiments, service dependency objects are represented by edges of the service dependency graph structure. In some embodiments, a graphical representation of the service dependency graph structure can be, at least partially, rendered via a graphical user interface. The service dependency graph structure may comprise one or more weighted graphs, multigraphs, isomorphic graphs, trees, the like, or combinations thereof.

The term "service dependency object" refers to a data structure representing a relationship between a service, or application, that relies on the functionality or a set of functionalities provided by another service. For example, an application may receive encrypted data from a first service, or application, and in order for the application to read the encrypted data it needs to be authenticated by a second service, which upon authentication provides an encryption key to read the encrypted data. In such an example, the service dependency object can be configured to represent a relationship between the first service, or application, and the second service. For example, the service dependency object may identify that an authentication process relationship requires the exchange of encrypted data. In some embodiments, service dependency objects can be configured to identify the first service, or application, and the second service such as by storing service object identifiers associated with each.

The term "code deployment" refers to a process of transitioning a code (e.g., software code) or code modifications from a software development environment to a production environment. In some embodiments, code deployment may include moving code modifications into different software environments (e.g., from one software environment to another software environments). Such software environments may include testing environment, staging environment, and production environment. In some embodiments, a code deployment is associated with a code deployment data object that includes attributes of the code deployment that are extracted as code deployment features.

The term "code deployment data object" refers to a data object associated with a code deployment. The code deployment data object may describe attributes of the code deployment. In some embodiments, the code deployment data object includes a plurality of attribute data fields that include the attributes of the code deployment. Examples of code deployment attribute data fields include, but not limited to, description attribute data field (e.g., code deployment description attribute data field) that stores a description of the code deployment, a timestamp attribute data field that stores a timestamp associated with the code deployment (e.g., date and/or time when the code was deployed), an entity attribute data field that is used to specify the domain that the code deployment is related to, such as name of service, server, or application.

The term "code deployment feature" describes an attribute data field of a code deployment data object and/or an embedded representation of a natural language format field of the code deployment data object. For example, code deployment features describe any data, object, detail, attribute, embedding transformation, or the like that is extracted from a code deployment data object (e.g., by a feature extraction model) for use by one or more modules of an incident mitigation system. Such code modification features may include embedding or vector transformations of text (e.g., description of the code modification, entities associated with the code modification, etc.), software identifiers, service or microservice identifiers, and other data or metadata.

The term "code modification" refers to a process of a data entity that describes a process of changing a code in a software environment. In some embodiments, a code modification is associated with a code modification data object that includes attributes of the code modification that are extracted as code modification features.

The term "code modification data object" refers to a data object associated with a code modification. The code modification data object may describe attributes of the code modification. In some embodiments, the code modification data object includes a plurality of attribute data fields that include the attributes associated with the code modification. Examples of code modification attribute data fields include, but not limited to, description attribute data field (e.g., code modification description attribute data field) that stores a description of the code modification, a timestamp attribute data field that stores a timestamp associated with the code modification (e.g., data and/or time when the code was modified), an entity attribute data field that is used to specify the domain that the code modification is related to, such as name of service, server, or application.

The term "code modification feature" describes an attribute data field of a code modification data object and/or an embedded representation of a natural language format field of the code modification data object. For example, code modification features describe any data, object, detail, attribute, embedding transformation, or the like that is extracted from a code modification data object (e.g., by a feature extraction model) for use by one or more modules of an incident mitigation system. Such code modification features may include embedding or vector transformations of text (e.g., description of the code modification, entities associated with the code modification, etc.), software identifiers, service or microservice identifiers, and other data or metadata.

The term "candidate code deployment data object" refers to a code deployment data object that is output by a prediction module of an incident mitigation system from a plurality of data objects associated with an incident. The candidate code deployment data object may be identified by the prediction module as a possible cause of an incident. In some embodiments a candidate code deployment data object may be ranked relative to other candidate code deployment data objects and/or candidate code modification data objects using a ranking framework as described herein.

The term "candidate code modification data object" refers to a code modification data object that is output by a prediction module of an incident mitigation system from a plurality of data objects associated with an incident. The candidate code modification data object may be identified by the prediction module as a possible cause of an incident. In some embodiments a candidate code modification data object may be ranked relative to other candidate code modification data objects and/or candidate code deployment data objects using a ranking framework as described herein.

The term "candidate incident mitigation dataset" refers to an intermediate output of an incident mitigation system. For example a candidate incident mitigation dataset may include a plurality of incident mitigating predictions that may potentially be recommended to a user. For example, a candidate incident mitigation dataset may include a plurality of candidate code deployment data objects that correspond to historical code deployments predicted as a possible cause of an incident. Alternatively or additionally, a candidate incident mitigation dataset may include a plurality of candidate code modification data objects that correspond to historical code modifications predicted as a possible cause of an incident. In some embodiments, a candidate incident mitigation dataset may be ranked based on one or more criteria including, but not limited to, user-generated content, usage data (e.g., data object usage), and/or the like.

The term "incident mitigating prediction" refers to a final output of an incident mitigation system. An incident mitigating prediction may describe a suggestion, recommendation, or the like configured to correct an incident, minimize the impact of an incident, prevent the occurrence of subsequent incidents, and/or the like. Examples of an incident mitigating prediction includes code modification recommendations, code deployment modification recommendations, or the like. For example, an incident mitigating prediction may comprise a code deployment data object that correspond to an historical code deployment that is predicted as a possible cause of an incident, whereby the incident may be mitigated by applying corrective action with respect to the historical code deployment. For example, an incident mitigating prediction may comprise a code modification data object that correspond to an historical code modification that is predicted as a possible cause of an incident, whereby the incident may be mitigated by applying corrective action with respect to the historical code modification. An incident mitigating prediction may be provided to a user. For example, an incident mitigating prediction may be included in a user interface rendered on a client computer device.

The term "ranked candidate incident mitigation dataset" refers to output of a ranking model. A ranked candidate incident mitigation dataset may include a plurality of incident mitigating predictions intermediate output (e.g., candidate code deployment data objects and/or candidate code modification data objects) of an incident mitigation system each associated with a rank value. In some embodiments, a ranked candidate incident mitigation dataset may be generated using one or more ranking models such as, for example, a learning-to-rank model. In some embodiments, a ranked candidate incident mitigation dataset may be generated based on one or more factors including, but not limited to data object usage data, user-generated content, or the like. In some embodiments, a ranked candidate incident mitigation dataset may be generated based on a ranking framework that includes programmatically generating one or more scores (e.g., semantic similarity score, topological distance score, temporal score, or the like) for candidate code deployment data objects and/or candidate code modification data objects in a candidate incident mitigation dataset, and ranking the candidate code deployment data objects and/or candidate code modification data objects based on the programmatically generated scores.

The term "semantic similarity score" refers to a value indicating the relevance of a data object to another data object based on the similarity between certain features of the data objects. In some embodiments, the semantic similarity score for a first data object relative to a second data object is generated based on the description attribute data field for each data object. For example, the semantic similarity score for a candidate code deployment data object with respect to an incident data object may be generated based on the description attribute data field for the code deployment data object and the description attribute data field for the incident data object. As another example, the semantic similarity score for a candidate code modification data object with respect to an incident data object may be generated based on the description attribute data field for the code modification data object and the description attribute data field for the incident data object. One or more of a variety of techniques may be leveraged to generate semantic similarity scores. Examples of such techniques include, but not limited, to cosine similarity, Euclidean similarity, or the like. In some embodiments, the semantic similarity score for a candidate code deployment data object or a candidate code modification data object may be leveraged to rank the candidate code deployment data object or a candidate code modification data object.

The term "topological distance score" refers to a value indicating the relevance of a data object to another data object based on the distance between the nodes representing the data objects in a topological graph structure. In some embodiments, the topological distance for a first data object relative to a second data object is generated by traversing the topological graph structure (e.g., using a machine learning model) to determine the distance (e.g., number of hops) between the nodes representing the data objects. For example, the topological distance score for a candidate code deployment data object with respect to an affected service data object may be generated by determining the distance between the node representing the candidate code deployment data object and the node representing the affected service data object in the topological graph structure. As another example, the topological distance score for a candidate code modification data object with respect to an affected service data object may be generated by determining the distance between the node representing the candidate code modification data object and the node representing the affected service data object in the topological graph structure.

The term "temporal score" refers to a value indicating the relevance of a data object to another data object based on the proximity. In some embodiments, the temporal score for a candidate code deployment data object may be generated by comparing the timestamp associated with the candidate code deployment data object to a current timestamp or timestamp associated with the incident data object. In some embodiments, the temporal score for a candidate code modification data object may be generated by comparing the timestamp associated with the candidate code modification data object to a current timestamp or timestamp associated with the incident data object.

The terms "usage related data," "usage data," "data object usage data" or the like refer to a type of data classification that is associated with a data object that contains user or application activity data (e.g., logs for interaction inputs, etc.). For example, the interaction received from a user, via at least a user interface of a computing device, associated with a cloud-based collaboration software can be logged by one or more applications. In some embodiments, the usage related data comprises one or more of direct interaction data, indirect interaction data, audit logs, application logs (i.e., data specific to a particular application, for example biometric data for a medical records software or location data for a mapping application), telemetry data, or the like. In some embodiments, direct interaction data may comprise interaction inputs received from a user, via at least a user interface, into an explicit application interface. For example, direct interaction data may include, without limitation, the number of times a user mouse-clicked on a particular graphical interface element associated with an application. In some embodiments, indirect interaction data may comprise interaction inputs received from a user, via at least a user interface, into a computing device associated with an application. For example, indirect interaction data may include, without limitation, the amount of time a user spends viewing particular application content (e.g., a mandatory employee training manual posted by a manager to a cloud-based collaboration software, etc.).

The terms "user-generated content," "UGC," or the like refer to a type of data classification that is associated with a data object created by one or more users of an application that generated the data object (e.g., free-form text, audio files, video files, the like, or combinations thereof). For example, a user of a cloud-based collaboration software can provide data objects, via at least a computing device to the software application, that are particular to their instance of the collaboration software.

The terms "machine learning module," "machine learning model," "ML module(s)," or "ML model(s)" refer to a machine learning or deep learning task or mechanism. The term "machine learning" refers to a method used to devise complex models and algorithms that lend themselves to prediction. A machine learning model is a computer-implemented algorithm that may learn from data with or without relying on rules-based programming. These models enable reliable, repeatable decisions and results and uncovering of hidden insights through machine-based learning from historical relationships and trends in the data. In some embodiments, the machine learning model is a clustering model, a regression model, a neural network, a random forest, a decision tree model, a classification model, or the like.

A machine learning model is initially fit or trained on a training dataset (e.g., a set of examples used to fit the parameters of the model). The model may be trained on the training dataset using supervised or unsupervised learning. The model is run with the training dataset and produces a result, which is then compared with a target, for each input vector in the training dataset. Based on the result of the comparison and the specific learning algorithm being used, the parameters of the model are adjusted.

The machine learning models as described herein may make use of multiple ML engines (e.g., for analysis, transformation, and other needs). The system may train different ML models for different needs and different ML-based engines. The system may generate new models (based on the gathered training data) and may evaluate their performance against the existing models. Training data may include any of the gathered information, as well as information on actions performed based on the various recommendations.

The ML models may be any suitable model for the task or activity implemented by each ML-based engine. Machine learning models may be some form of neural network. The underlying ML models may be learning models (supervised or unsupervised). As examples, such algorithms may be prediction (e.g., linear regression) algorithms, classification (e.g., decision trees) algorithms, time-series forecasting (e.g., regression-based) algorithms, association algorithms, clustering algorithms (e.g., K-means clustering, Gaussian mixture models, DBscan), or Bayesian methods (e.g., Naïve Bayes, Bayesian model averaging, Bayesian adaptive trials), image to image models (e.g., FCN, PSPNet, U-Net) sequence to sequence models (e.g., RNNs, LSTMs, BERT, Autoencoders) or Generative models (e.g., GANs).

The ML models may implement statistical algorithms, such as dimensionality reduction, hypothesis testing, one-way analysis of variance (ANOVA) testing, principal component analysis, conjoint analysis, neural networks, support vector machines, decision trees (including random forest methods), ensemble methods, and other techniques. Other ML models may be generative models (such as Generative Adversarial Networks or auto-encoders).

In various embodiments, the ML models may undergo a training or learning phase before they are released into a production or runtime phase or may begin operation with models from existing systems or models. During a training or learning phase, the ML models may be tuned to focus on specific variables, to reduce error margins, or to otherwise optimize their performance. The ML models may initially receive input from a wide variety of data, such as the gathered data described herein. The ML models herein may undergo a second or multiple subsequent training phases for retraining the models.

Thus, use of any such terms, as defined herein, should not be taken to limit the spirit and scope of embodiments of the present disclosure.

Example System Architecture

Methods, apparatuses, and computer program products of the present disclosure may be embodied by any of a variety of devices. For example, the method, apparatus, and computer program product of an example embodiment may be embodied by a networked device (e.g., an enterprise platform, etc.), such as a server or other network entity, configured to communicate with one or more devices, such as one or more query-initiating computing devices. Additionally or alternatively, the computing device may include fixed computing devices, such as a personal computer or a computer workstation. Still further, example embodiments may be embodied by any of a variety of mobile devices, such as a portable digital assistant (PDA), mobile telephone, smartphone, laptop computer, tablet computer, wearable, the like or any combination of the aforementioned devices. FIG. 1 provides an example system architecture 100 within which embodiments of the present disclosure may operate. The depiction of the example system architecture 100 is not intended to limit or otherwise confine the embodiments described and contemplated herein to any particular configuration of elements or systems, nor is it intended to exclude any alternative configurations or systems for the set of configurations and systems that can be used in connection with embodiments of the present disclosure. Rather, FIG. 1 and the system architecture 100 disclosed therein is merely presented to provide an example basis and context for the facilitation of some of the features, aspects, and uses of the methods, apparatuses, computer readable media, and computer program products disclosed and contemplated herein. It will be understood that while many of the aspects and components presented in FIG. 1 are shown as discrete, separate elements, other configurations may be used in connection with the methods, apparatuses, computer readable media, and computer programs described herein, including configurations that combine, omit, and/or add aspects and/or components.

The example system architecture 100 includes an incident mitigation system 101 and one or more client computing devices, such as client computing devices 102A, client computing device 102B, and client computing device 102C. The incident mitigation system 101 may be configured to interact with one or more client computing devices. The incident mitigation system 101 may be configured to receive an incident indication from a client computing device. The incident mitigation system 101 may identify one or more data objects associated with the incident and originating from one or sources (e.g., an application, a service, etc.). The incident mitigation system 101 may process and/or analyze the one or more data objects to generate a candidate incident mitigation dataset. The incident mitigation system 101 may rank the candidate incident mitigation dataset to generate a ranked candidate incident mitigation dataset. The incident mitigation system 101 may generate one or more incident mitigating predictions based on the ranked candidate incident mitigation dataset. The incident mitigation system 101 may cause rendering of one or more interfaces (e.g., an incident mitigation user interface) on a display of a client computing device. The one or more interfaces may comprise the one or more incident mitigating predictions or a portion of the one or more incident mitigating predictions.

In some embodiments, the functions of one or more of the illustrated components in FIG. 1 may be performed by a single computing device or by multiple computing devices, which devices may be local or cloud based. It will be appreciated that the various functions performed by the incident mitigation system 101 and the one or more client computing entities may be embodied by a single apparatus, subsystem, or system comprising one or more sets of computing hardware (e.g., processor(s) and memory) configured to perform the various functions thereof. For example, in some embodiments, one or more of the components of the incident mitigation system 101 may be embodied by a client computing device. For example, in some embodiments, the incident mitigation system 101 may be, at least partially, hosted on a client computing device.

The incident mitigation system 101 may be communicably connected to one or more applications, services, servers, computing devices, or remote repositories either directly or indirectly. The incident mitigation system 101 may transmit or receive data objects, and other communication or interaction inputs, from an application server 140 or from a service server 150. In some embodiments, application server 140 and/or service server 150 may be associated with an application (e.g., enterprise system, cloud storage software, collaboration software, help desk software, or the like) for which incident mitigation system 101 is specifically configured to provide incident mitigation operations. In embodiments, the incident mitigation system 101 may be, at least partially, hosted on application server 140 and/or service server 150.

In some embodiments, the incident mitigation system 101 may be, at least partially, integrated into an application or a service (e.g., such as via a service proxy or the like). In embodiments, the incident mitigation system 101 may be, at least partially, hosted on incident mitigation server 106 and accessible to the application server 140 and/or service server 150 via a connection facilitated by network 104.

In the depicted embodiment, as shown in FIG. 1, the incident mitigation system 101 includes an incident mitigation server 106 and a storage subsystem 108. For example, the incident mitigation system 101 may be hosted on a computing device (e.g., incident mitigation server 106). The incident mitigation server 106 may be configured to perform various functionalities of the incident mitigation system 101 including, but not limited to, receiving incident indications from client computing devices, identifying one or more data objects associated with the incident, processing and/or analyzing the one or more data objects to generate a candidate incident mitigation dataset, ranking the candidate incident mitigation dataset to generate ranked candidate incident mitigation dataset, generating one or more incident mitigating predictions, and causing rendering of one or more interfaces comprising at least a portion of the one or more incident mitigating predictions on a display of a client computing device.

In some embodiments, the storage subsystem 108 is configured to store data associated with the incident mitigation server 106, such as, for example, training data for the one or more machine learning models 124, the one more machine learning models 124, or the like. In some embodiments, the storage subsystem 108 may include one or more repositories including, but not limited to, a connected data repository 125, a topology repository 126, or the like. The connected data repository 125 may store connected data graph structures leveraged by the incident mitigation server 106 to generate candidate incident mitigation datasets comprising code deployment data objects and/or code modification data objects. The topology repository 126 may store topology graph structures leveraged by the incident mitigation server 106 to generate candidate incident mitigation datasets as described above.

In some embodiments, the storage subsystem 108 may comprise two subsystems, where a first storage subsystem comprise the connected data repository 125 and topology repository 126, and a second storage subsystem comprising the machine learning models 124 and a feature storage repository configured for storing features extracted from one or more data objects. In some embodiments, the storage subsystem 108 may be hosted on a separate server and accessible to the incident mitigation server 106 and/or incident mitigation system 101 via a connection facilitated by network 104 (e.g., local area network, virtual private network, the Internet, etc.).

In the depicted embodiment, as shown in FIG. 1, the incident mitigation server 106 includes an incident mitigation management module 110, a feature extraction module 112, a connected data module 114, a prediction module 116, and/or a ranking module 118. In the depicted embodiment, as shown in FIG. 1, each of the incident mitigation management module 110, feature extraction module 112, connected data module 114, prediction module 116, and/or ranking module 118 may be any means such as a device or circuitry embodied in either hardware, software, or a combination of hardware and software configured to facilitate and/or perform one or more functionalities associated with generating incident mitigating predictions.

The incident mitigation management module 110 may be configured to orchestrate various functionalities associated with generating incident mitigating predictions and causing rendering of one or more interfaces on a display of one or more client computing devices, including receiving and/or transmitting, one or more datasets, objects, instructions, and/or the like from and/or to one or more other modules (e.g., feature extraction module 112, connected data module 114, prediction module 116, and/or ranking module 118) and outputting data and/or instructions configured to cause rendering of one or more incident mitigation user interfaces. In some embodiments, the datasets, objects, and/or the like received and/or transmitted by the incident mitigation management module 110 may comprise input to or more machine learning models 124 and/or output of one or more machine learning models 124 as further described herein.

The feature extraction module 112 may be configured to receive an incident data object as input and process the incident data object to extract, from the incident data object, one or more incident features associated with the incident data object. The feature extraction module 112 may be configured to provide the incident features to the incident mitigation management module 110. The incident mitigation management module 110 may be configured to provide the one or more incident features associated with the incident data object to one or more modules of the incident mitigation server 106 (e.g., for use in performing one or more functionalities associated with generating incident mitigating predictions) and/or leverage the one or more incident features to generate one or more incident mitigating predictions. In some embodiments, the incident mitigation management module 110 is configured to transmit data, signals, and/or instructions to the feature extraction module 112 configured to cause the feature extraction module 112 to receive an incident data object associated with an incident identifier.

In some embodiments, the connected data module 114 is configured to identify or retrieve a plurality of data objects originating from one or more sources (e.g., an application, a service, etc.) and generate relation data that describes relationships between and/or among the plurality of data objects. For example, the connected data module 114 may be configured to receive an incident identifier from the incident mitigation management module 110, identify and/or retrieve a plurality of data objects based on the incident identifier, and generate relation data that describes relationships between and/or among the plurality of data objects. The data objects, for example, may originate from Jira Service Management (JSM) by Atlassian, Inc. Jira Software (JSW) by Atlassian, Inc., Open Toolchain and/or the like. For example, the data objects may represent entities in various software platforms and/or tools such as JSM, JSW, Open Toolchain, or the like. In some embodiments, the connected data module 114 is configured to leverage a connected graph data structure to generate the relation data. In some embodiments, the connected data module 114 is configured to provide the relation data to the prediction module 116. In some embodiments, the connected data module 114 is configured to retrieve user-generated content and/or usage data associated with the plurality of data objects and provide the user-generated content and/or usage data to the ranking module 118. Alternatively, in some embodiments, the data feature extraction module may be configured to extract the user-generated content and/or usage data associated with the plurality of data objects.

In some embodiments, the prediction module 116 is configured to receive, from the connected data module 114, relation data for a plurality of data objects associated with an incident identifier and generate a candidate incident mitigation dataset based on topology graph structure for the plurality of data objects associated with the incident identifier and/or the relation data (e.g., which may include relationships between service data objects, relationships between projects and service data objects, relationships between code modification data objects and service data objects, relationships between code deployment data objects and service data objects, relationships between code deployment data objects, relationships between code modification data objects, relationship between code deployment data objects and code modification data objects, and/or the like) and/or historical service-related modification data (e.g., historical code modifications associated with a service including, for example, the affected service, historical code deployments associated with a service including for example, the affect service, or the like). In some embodiments, the historical service-related modification data (e.g., historical service-related modifications) is included in the relation data. In some embodiments, the prediction module 116 may retrieve the topology graph structure from a repository (e.g., topology repository 126) and process and/or analyze the relation data with the topology graph structure and/or the historical service-related modification data to generate a candidate incident mitigation dataset. For example, the prediction module 116 may leverage the relation information between an affected service data object originating from a particular source (e.g., JSM, etc.) and one or more other data objects (e.g., project data objects, issue data objects, sprint data objects, post incident report data objects, alert data objects, stakeholder data object, status data object, assignee data object, service level agreement data object, other service data objects and/or the like) originating from the particular source and/or other sources (e.g., JSW, etc.) along with the topology graph structure and/or the historical service-related modification data to generate a candidate incident mitigation dataset. In some embodiments, the prediction module 116 may be configured to provide the candidate incident mitigation dataset to the incident mitigation management module 110 configured to provide the candidate incident mitigation dataset to the ranking module 118. In some embodiments, the prediction module 116 may be configured to provide the candidate incident mitigation dataset directly to the ranking module 118.

In some embodiments, the ranking module 118 is configured to receive a candidate incident mitigation dataset from the prediction module 116 and rank the incident mitigating predictions in the candidate incident mitigation dataset using one or more ranking models, such as a learning-to-rank model. In some embodiments, the ranking module 118 ranks the incident mitigating predictions based on incident feedback received from one or more sources (e.g., feedback received from incident managers and/or other users with respect to an incident) and/or user-generated content and/or data object usage data received from the data object retrieval model. For example, the ranking module 118 may finetune the learning-to-rank model based on training input dataset comprising user feedback with respect to historical incident mitigating predictions and/or historical incidents. In some embodiments, the ranking module 118 may leverage a ranking framework that includes programmatically generating one or more scores (e.g., semantic similarity score, topological distance score, temporal score, or the like) for candidate code deployment data objects and/or candidate code modification data objects in a candidate incident mitigation dataset, and ranking the candidate code deployment data objects and/or candidate code modification data objects based on the programmatically generated scores to generate a ranked candidate incident mitigation dataset.

In some embodiments, the ranking module 118 is configured to provide the ranked candidate incident mitigation dataset (e.g., comprising a ranked list of candidate code deployment data objects and/or candidate code modification data objects) to the incident mitigation management module 110. In some embodiments, the incident mitigation management module 110 is configured to select one or more incident mitigating predictions (e.g., one or more candidate code deployment data objects and/or candidate code modification data objects) from the ranked candidate incident mitigation dataset and provide the one or more selected incident mitigating predictions to one or more client computing devices. For example, the incident mitigation management module 110 may be configured to select top-N (e.g., N=1, 5, 20, etc.) ranked incident mitigating predictions from the ranked candidate incident mitigation dataset and cause rendering of an incident mitigation interface comprising at least a portion of the selected incident mitigating predication on the display of one or more client computing devices.

Two or more of the components illustrated in the incident mitigation system 101 and the system architecture 100 may be configured to communicate via one or more communication mechanisms (e.g., network 104) including wired or wireless connections, such as over a network, bus, or similar connection. For example, a network may include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, etc.). For example, the network may include a cellular telephone, an 802.11, 802.16, 802.20, and/or WiMAX network. Further, a network may include a public network, such as the Internet, a private network, such as an intranet, or combinations thereof, and may utilize a variety of networking protocols now available or later developed including, but not limited to TCP/IP based networking protocols.

In some embodiments, the components depicted in FIG. 1 as being included in the incident mitigation system 101, although not required to be an integral system, may be connected via one or more networks. In some embodiments, one or more APIs may be leveraged to communicate with and/or facilitate communication between one or more of the components illustrated in the incident mitigation system 101 and system architecture 100. It should be appreciated that while in the illustrated embodiment of FIG. 1, the incident mitigation management module 110 is configured to facilitate communication of data, objects, and/or the like between various modules (e.g., feature extraction module 112, connected data module 114, prediction module 116, ranking module 118) of the incident mitigation server 106, in some embodiments, alternatively or additionally, one or more modules of the incident mitigation server 106 may be configured to communicate directly with each other.

Example Apparatuses of the Disclosure

Having discussed example systems in accordance with the present disclosure, example apparatuses in accordance with the present disclosure will now be described.

Figure 2:
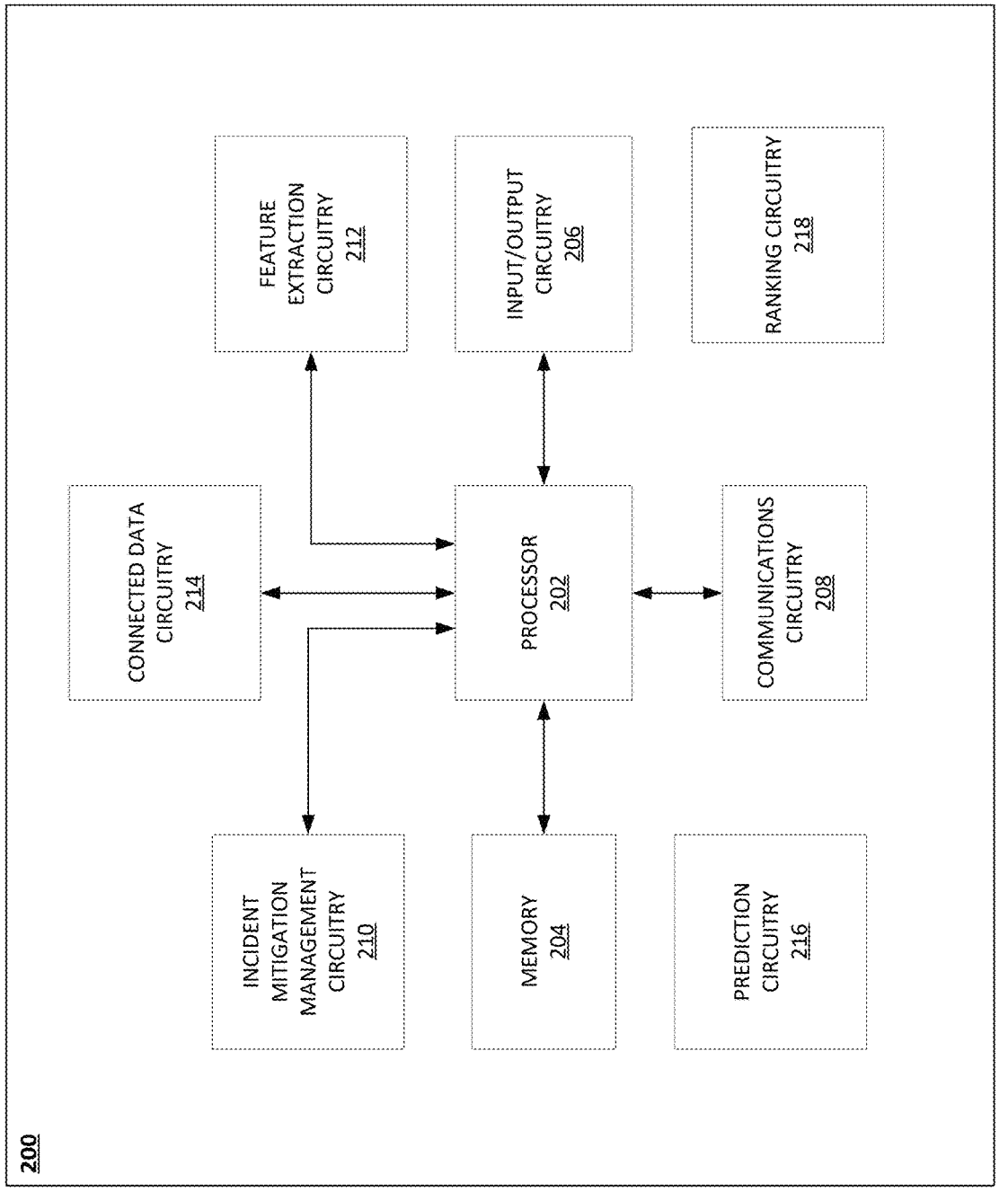
FIG. 2 is a block diagram of an apparatus in accordance with at least some embodiments of the present disclosure.

FIG. 2 illustrates a block diagram of an apparatus 200 in accordance with some example embodiments. For example, in some embodiments, incident mitigation system 101 (or one or more portions thereof), if embodied in a particular embodiment, may be embodied by one or more apparatuses 200. It should be noted, however, that the components, or elements illustrated in and described with respect to FIG. 2 below may not be mandatory and thus one or more may be omitted in certain embodiments. Additionally, some embodiments, may include further or different components or elements beyond those illustrated in and described with respect to FIG. 2. In some embodiments, the functionality of the incident mitigation system 101 or any subset thereof may be performed by a single apparatus 200 or multiple apparatuses 200. In some embodiments, the apparatus 200 may comprise one or a plurality of physical devices.

The apparatus 200 may include processor 202, memory 204, input/output circuitry 206, communications circuitry 208, incident mitigation management circuitry, feature extraction circuitry 212, connected data circuitry 214, prediction circuitry 216, and/or ranking circuitry 218. The apparatus 200 may be configured to execute the operations described herein. Although these components 202-218 are described with respect to functional limitations, it should be understood that the particular implementations necessarily include the use of particular hardware. It should also be understood that certain of these components 202-218 may include similar or common hardware. For example, two sets of circuitries may both leverage use of the same processor, network interface, storage medium, or the like to perform their associated functions, such that duplicate hardware is not required for each set of circuitries.

In some embodiments, the processor 202 (and/or co-processor or any other processing circuitry assisting or otherwise associated with the processor) may be in communication with the memory 204 via a bus for passing information among components of the apparatus. The memory 204 is non-transitory and may include, for example, one or more volatile and/or non-volatile memories. In other words, for example, the memory 204 may be an electronic storage device (e.g., a computer-readable storage medium). The memory 204 may be configured to store information, data, content, applications, instructions, or the like for enabling the apparatus to carry out various functions in accordance with example embodiments of the present invention.

The processor 202 may be embodied in a number of different ways and may, for example, include one or more processing devices configured to perform independently. In some preferred and non-limiting embodiments, the processor 202 may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In some preferred and non-limiting embodiments, the processor 202 may be configured to execute instructions stored in the memory 204 or otherwise accessible to the processor 202. In some preferred and non-limiting embodiments, the processor 202 may be configured to execute hard-coded functionalities. As such, whether configured by hardware or software methods, or by a combination thereof, the processor 202 may represent an entity (e.g., physically embodied in circuitry) capable of performing operations according to an embodiment of the present invention while configured accordingly. Alternatively, as another example, when the processor 202 is embodied as an executor of software instructions, the instructions may specifically configure the processor 202 to perform the algorithms and/or operations described herein when the instructions are executed.

In some embodiments, the apparatus 200 may include input/output circuitry 206 that may, in turn, be in communication with processor 202 to provide output to the user and, in some embodiments, to receive an indication of a user input. The input/output circuitry 206 may comprise a user interface and may include a display, and may comprise a web user interface, a mobile application, a query-initiating computing device, a kiosk, or the like. In some embodiments, the input/output circuitry 206 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 204, and/or the like).

The communications circuitry 208 may be any means such as a device or circuitry embodied in either hardware or a combination of hardware and software that is configured to receive and/or transmit data from/to a network and/or any other device, circuitry, or module in communication with the apparatus 200. In this regard, the communications circuitry 208 may include, for example, a network interface for enabling communications with a wired or wireless communication network. For example, the communications circuitry 208 may include one or more network interface cards, antennae, buses, switches, routers, modems, and supporting hardware and/or software, or any other device suitable for enabling communications via a network. Additionally, or alternatively, the communications circuitry 208 may include the circuitry for interacting with the antenna/antennae to cause transmission of signals via the antenna/antennae or to handle receipt of signals received via the antenna/antennae.

In some embodiments, the apparatus 200 includes an incident mitigation management circuitry 210. The incident mitigation management circuitry 210 may include hardware components, software components, and/or a combination thereof configured to, with the processor 202, memory 204, input/output circuitry 206 and/or communications circuitry 208, perform one or more functions associated with an incident mitigation management module (as described above with reference to FIG. 1). In some embodiments, the incident mitigation management circuitry 210 may be configured to receive and/or transmit data, objects, and/or the like from and/or to one or more components of the apparatus 200, through, for example, the use of applications or APIs executed using a processor, such as the processor 202. It should also be appreciated that, in some embodiments, the incident mitigation management circuitry may include a separate processor, specially configured field programmable gate array (FPGA), or application specific interface circuit (ASIC) to provide or otherwise facilitate access to such data, objects, and/or the like used by one or more other components of the apparatus 200. The incident mitigation management circuitry may also provide for communication with other components of the apparatus, system and/or external systems via a network interface provided by the communications circuitry 208.

In some embodiments, the apparatus 200 includes a feature extraction circuitry 212. The feature extraction circuitry 212 may include hardware components, software components, and/or a combination thereof configured to, with the processor 202, memory 204, input/output circuitry 206 and/or communications circuitry 208, perform one or more functions associated with a feature extraction module (as described above with reference to FIG. 1). In some embodiments, the feature extraction circuitry 212 may be configured to receive and/or transmit data, objects, and/or the like from and/or to one or more components of the apparatus 200, through, for example, the use of applications or APIs executed using a processor, such as the processor 202. It should also be appreciated that, in some embodiments, the feature extraction circuitry 212 may include a separate processor, specially configured field programmable gate array (FPGA), or application specific interface circuit (ASIC) to provide or otherwise facilitate access to such data, objects, and/or the like used by one or more other components of the apparatus 200. The feature extraction circuitry 212 may also provide for communication with other components of the apparatus, system and/or external systems via a network interface provided by the communications circuitry 208.

In some embodiments, the apparatus 200 includes a connected data circuitry 214. The connected data circuitry 214 may include hardware components, software components, and/or a combination thereof configured to, with the processor 202, memory 204, input/output circuitry 206 and/or communications circuitry 208, perform one or more functions associated with a connected data module (as described above with reference to FIG. 1). In some embodiments, the connected data circuitry may be configured to receive and/or transmit data, objects, and/or the like from and/or to one or more components of the apparatus 200, through, for example, the use of applications or APIs executed using a processor, such as the processor 202. It should also be appreciated that, in some embodiments, the connected data circuitry 214 may include a separate processor, specially configured field programmable gate array (FPGA), or application specific interface circuit (ASIC) to provide or otherwise facilitate access to such data, objects, and/or the like used by one or more other components of the apparatus 200. The connected data circuitry 214 may also provide for communication with other components of the apparatus, system and/or external systems via a network interface provided by the communications circuitry 208.

In some embodiments, the apparatus 200 includes a prediction circuitry 216. The prediction circuitry 216 may include hardware components, software components, and/or a combination thereof configured to, with the processor 202, memory 204, input/output circuitry 206 and/or communications circuitry 208, perform one or more functions associated with a prediction module (as described above with reference to FIG. 1). In some embodiments, the prediction circuitry 216 may be configured to receive and/or transmit data, objects, and/or the like from and/or to one or more components of the apparatus 200, through, for example, the use of applications or APIs executed using a processor, such as the processor 202. It should also be appreciated that, in some embodiments, the prediction circuitry 216 may include a separate processor, specially configured field programmable gate array (FPGA), or application specific interface circuit (ASIC) to provide or otherwise facilitate access to such data, objects, and/or the like used by one or more other components of the apparatus 200. The prediction circuitry 216 may also provide for communication with other components of the apparatus, system and/or external systems via a network interface provided by the communications circuitry 208.

In some embodiments, the apparatus 200 includes a ranking circuitry 218. The ranking circuitry 218 may include hardware components, software components, and/or a combination thereof configured to, with the processor 202, memory 204, input/output circuitry 206 and/or communications circuitry 208, perform one or more functions associated with a ranking module (as described above with reference to FIG. 1). In some embodiments, the ranking circuitry 218 may be configured to receive and/or transmit data, objects, and/or the like from and/or to one or more components of the apparatus 200, through, for example, the use of applications or APIs executed using a processor, such as the processor 202. It should also be appreciated that, in some embodiments, the ranking circuitry 218 may include a separate processor, specially configured field programmable gate array (FPGA), or application specific interface circuit (ASIC) to provide or otherwise facilitate access to such data, objects, and/or the like used by one or more other components of the apparatus 200. The ranking circuitry 218 may also provide for communication with other components of the apparatus, system and/or external systems via a network interface provided by the communications circuitry 208.

Additionally or alternatively, in some embodiments, two or more of the sets of circuitries embodying processor 202, memory 204, input/output circuitry 206, communications circuitry 208, incident mitigation management circuitry, feature extraction circuitry 212, connected data circuitry 214, prediction circuitry 216, and/or ranking circuitry are combinable. Alternatively or additionally, in some embodiments, one or more of the sets of circuitry perform some or all of the functionality described associated with another component. For example, in some embodiments, two or more of the sets of circuitry embodied by processor 202, memory 204, input/output circuitry 206, and communications circuitry 208, incident mitigation management circuitry, feature extraction circuitry 212, connected data circuitry 214, prediction circuitry 216, and/or ranking circuitry 218 are combined into a single module embodied in hardware, software, firmware, and/or a combination thereof. Similarly, in some embodiments, one or more of the sets of circuitry, for example, incident mitigation management circuitry, feature extraction circuitry 212, connected data circuitry 214, prediction circuitry 216, and/or ranking circuitry 218 is/are combined with the processor 202, such that the processor 202 performs one or more of the operations described above with respect to each of these sets of circuitry embodied by incident mitigation management circuitry, feature extraction circuitry 212, connected data circuitry 214, prediction circuitry 216, and/or ranking circuitry 218.

It is also noted that all or some of the information discussed herein can be based on data that is received, generated and/or maintained by one or more components of apparatus 200. In some embodiments, one or more external systems (such as a remote cloud computing and/or data storage system) may also be leveraged to provide at least some of the functionality discussed herein.

Example Client Computing Device

Figure 3:
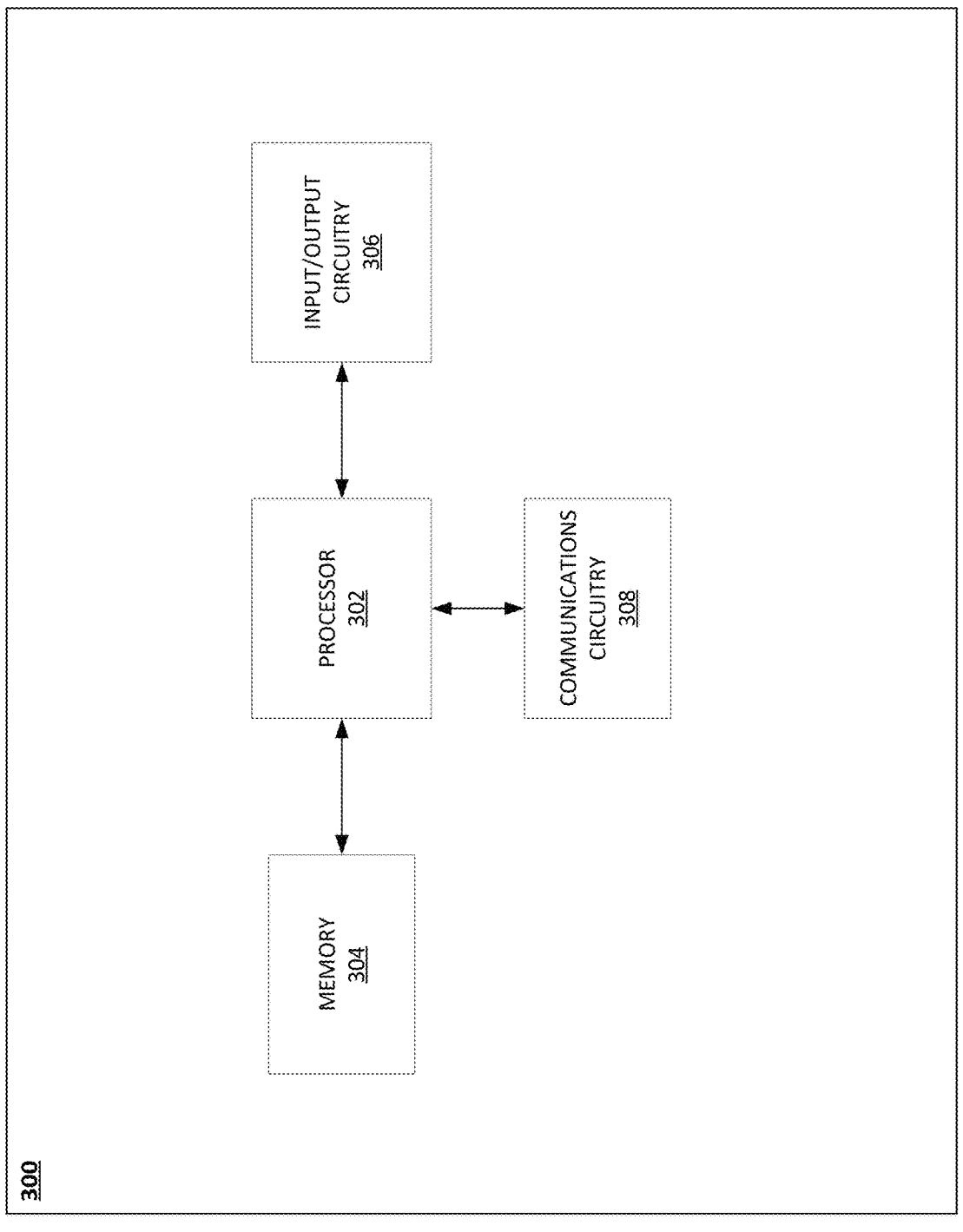
FIG. 3 is a block diagram of an example client computing device structured in accordance with at least some embodiments of the present disclosure.

Referring now to FIG. 3, a client computing device may be embodied by one or more computing systems, such as apparatus 300 shown in FIG. 3. The apparatus 300 may include processor 302, memory 304, input/output circuitry 306, and a communications circuitry 308. Although these components 302-308 are described with respect to functional limitations, it should be understood that the particular implementations necessarily include the use of particular hardware. It should also be understood that certain of these components 302-308 may include similar or common hardware. For example, two sets of circuitries may both leverage use of the same processor, network interface, storage medium, or the like to perform their associated functions, such that duplicate hardware is not required for each set of circuitries.

In some embodiments, the processor 302 (and/or co-processor or any other processing circuitry assisting or otherwise associated with the processor) may be in communication with the memory 304 via a bus for passing information among components of the apparatus. The memory 304 is non-transitory and may include, for example, one or more volatile and/or non-volatile memories. In other words, for example, the memory 304 may be an electronic storage device (e.g., a computer-readable storage medium). The memory 304 may include one or more databases. Furthermore, the memory 304 may be configured to store information, data, content, applications, instructions, or the like for enabling the apparatus 300 to carry out various functions in accordance with example embodiments of the present invention.

The processor 302 may be embodied in a number of different ways and may, for example, include one or more processing devices configured to perform independently. In some preferred and non-limiting embodiments, the processor 302 may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In some preferred and non-limiting embodiments, the processor 302 may be configured to execute instructions stored in the memory 304 or otherwise accessible to the processor 302. In some preferred and non-limiting embodiments, the processor 302 may be configured to execute hard-coded functionalities. As such, whether configured by hardware or software methods, or by a combination thereof, the processor 302 may represent an entity (e.g., physically embodied in circuitry) capable of performing operations according to an embodiment of the present invention while configured accordingly. Alternatively, as another example, when the processor 302 is embodied as an executor of software instructions (e.g., computer program instructions), the instructions may specifically configure the processor 302 to perform the algorithms and/or operations described herein when the instructions are executed.

In some embodiments, the apparatus 300 may include input/output circuitry 306 that may, in turn, be in communication with processor 302 to provide output to the user and, in some embodiments, to receive an indication of a user input. The input/output circuitry 306 may comprise a user interface and may include a display, and may comprise a web user interface, a mobile application, a query-initiating computing device, a kiosk, or the like.

In embodiments in which the apparatus 300 is embodied by a limited interaction device, the input/output circuitry 306 includes a touch screen and does not include, or at least does not operatively engage (i.e., when configured in a tablet mode), other input accessories such as tactile keyboards, track pads, mice, etc. In other embodiments in which the apparatus is embodied by a non-limited interaction device, the input/output circuitry 306 may include at least one of a tactile keyboard (e.g., also referred to herein as keypad), a mouse, a joystick, a touch screen, touch areas, soft keys, and other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 304, and/or the like).

The communications circuitry 308 may be any means such as a device or circuitry embodied in either hardware or a combination of hardware and software that is configured to receive and/or transmit data from/to a network and/or any other device, circuitry, or module in communication with the apparatus 300. In this regard, the communications circuitry 308 may include, for example, a network interface for enabling communications with a wired or wireless communication network. For example, the communications circuitry 308 may include one or more network interface cards, antennae, buses, switches, routers, modems, and supporting hardware and/or software, or any other device suitable for enabling communications via a network. Additionally, or alternatively, the communications circuitry 308 may include the circuitry for interacting with the antenna/antennae to cause transmission of signals via the antenna/antennae or to handle receipt of signals received via the antenna/antennae.

It is also noted that all or some of the information discussed herein can be based on data that is received, generated and/or maintained by one or more components of apparatus 300. In some embodiments, one or more external systems (such as a remote cloud computing and/or data storage system) may also be leveraged to provide at least some of the functionality discussed herein.

Exemplary Data Flows and Operations

As indicated, some embodiments of the present disclosure make important technical contributions to incident management systems and/or techniques. In particular, systems and methods are disclosed herein that implement a specially-configured incident mitigation process for improving incident mitigation systems that leverages one or more machine learning models. By doing so, incident mitigation techniques described herein may provide an improvement in incident management systems that may be practically applied to improve various computing tasks, including incident management tasks.

Figure 4A:
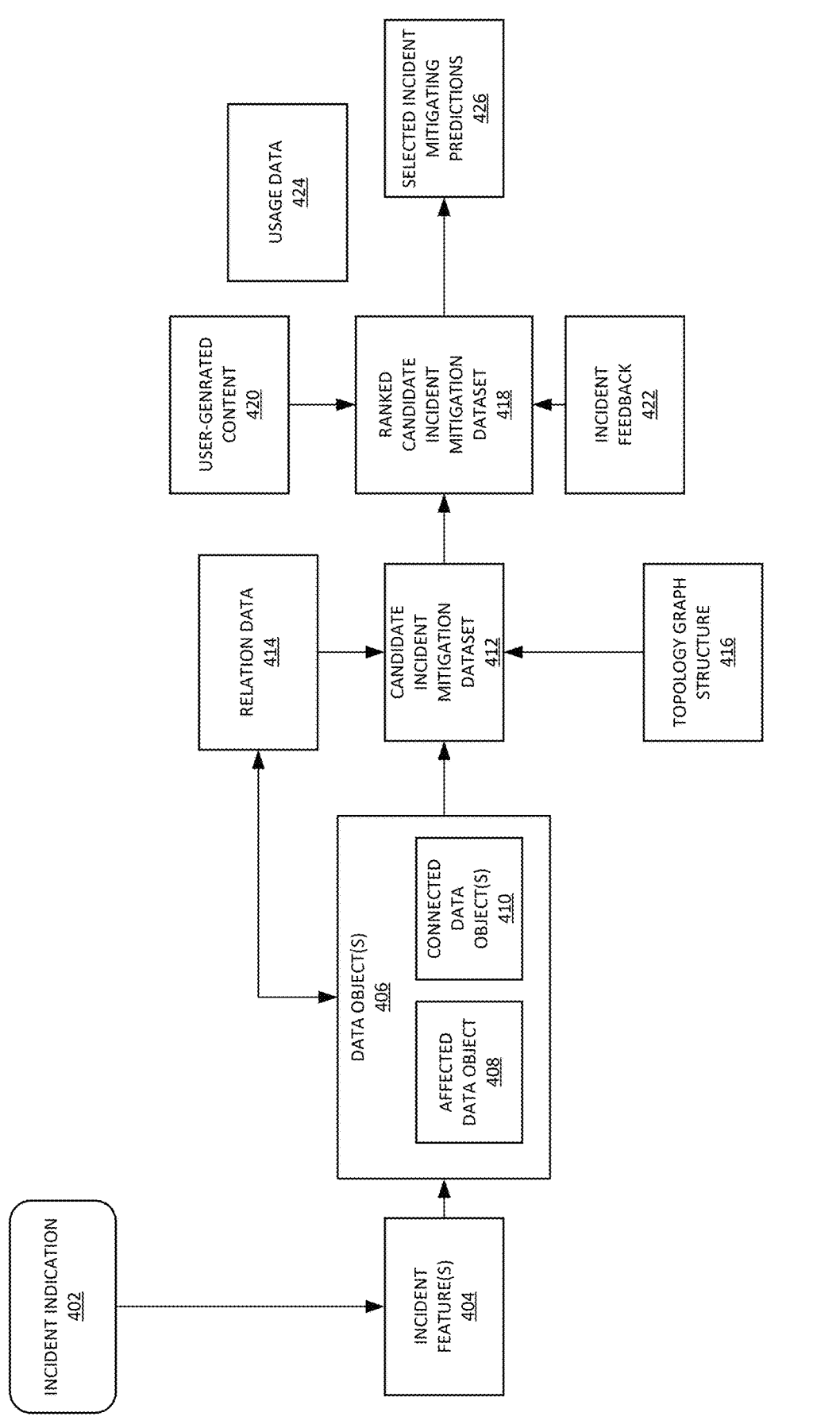
FIG. 4A illustrates a visualization of an example data environment for generating incident mitigating predictions in accordance with at least some embodiments of the present disclosure.

FIG. 4A illustrates a visualization of an example data environment for generating incident mitigating predictions in accordance with at least some embodiments of the present disclosure.

In some embodiments, an incident indication 402 is received for an incident. In some embodiments, the incident indication 402 is received from a client computing device. In some embodiments, receiving the incident indication 402 comprises receiving an incident mitigation request from a client computing device.

In some embodiments an incident is a data entity that describes an event that causes disruption to or a reduction in the quality of a service associated with a software application, a service, a software application feature, a network, and/or a device. In one example, an incident associated with a monitored software application may require an emergency response. In some embodiments, an incident is created based on alert data associated with one or more alerts and/or conditions for creating an incident. In some examples, an incident may be automatically created in response to the number of alerts associated with a particular service exceeding a threshold associated with a parameter/keyword for a period of time. The incident may be embodied as or otherwise associated with an incident data object which includes incident attributes that are extracted as incident features.

In some embodiments, an incident indication is signal, data, and/or computer readable instructions that triggers an incident mitigating process configured to generate one or more incident mitigating predictions with respect to an incident. For example, one or more incident mitigating predictions may be automatically generated for an incident in response to an incident indication. In some embodiments, an incident indication may be generated by an information technology service management (ITSM) software applications such as Jira Service Management (JSM) by Atlassian, Inc., a program associated or integrated with an ITSM, or directly associated with an ITSM. Alternatively or additionally, in some embodiments, an incident indication may be generated by an incident mitigation system configured to generate incident mitigating predictions. In some embodiments, an incident indication may comprise an incident mitigation request or generated in response to an incident mitigation request.

In some embodiments, an incident mitigation request is signal, data, and/or computer readable instructions received by one or more computing devices (e.g., incident mitigation server) that comprise, represents, indicates, and/or is associated with a request to generate one or more incident mitigating predictions for an incident. In some embodiments, an incident mitigation request may include an incident data object and/or an incident identifier associated with the incident. For example, an incident mitigation request may comprise an incident identifier associated with an incident and may be indicative of a request to generate one or more incident mitigating predictions for the incident. As another example, an incident mitigation request may comprise an incident data object (which may include an incident identifier) associated with the incident and which may be leveraged to identify the incident and/or other incident features. In some embodiments, the incident mitigation request may be generated in response to user engagement with an interface (e.g., an incident mitigation interface, incident management interface, or the like). For example, an incident mitigation system may receive an incident mitigation request originating from a client computing device associated with a user (e.g., alert manager, team member, team manager, and/or the like) in response to user engagement with the interface.

In some embodiments, an incident identifier is one or more items or elements by which an incident may be uniquely identified from other incidents. The incident identifier may be in the form of text string(s), numerical character(s), alphabetical character(s), alphanumeric code(s), American Standard Code for information Interchange (ASCII) characters(s), and/or the like.

In some embodiments, one or more incident features 404 associated with the incident is extracted. In some embodiments, the one or more incident features is extracted using a feature extraction model and based on an incident data object associated with the incident.

In some embodiments, an incident feature describes an incident attribute data field of an incident data object and/or an embedded representation of a natural language format field (e.g., an incident message field) of the incident data object. For example, incident features describes any data, object, detail, attribute, embedding transformation, or the like that is extracted from an incident data object by a feature extraction model for use by one or more modules of an incident mitigation system and/or or one or more machine learning models. Such incident features may include embedding or vector transformations of text (e.g., incident message components, problem descriptions, etc.), software identifiers, service or microservice identifiers, and other data or metadata that are configured for input into a machine learning model and/or leveraged by one or more modules of an incident mitigation system to perform one or more stages of an incident mitigation process as described herein.

In some embodiments, an incident data object is a type of data object that includes one or more properties, attributes, and/or the like of an incident. For example, an incident may be embodied as or otherwise associated with an incident data object. In some embodiments, an incident data object includes a plurality of incident attribute data fields associated with the incident. Examples of incident attribute data fields of an incident data object include a message attribute data field that stores message data that indicates the basis of the incident creation, an entity attribute data field that is used to specify the domain that the incident is related to, such as name of the service, server, or application, an incident description attribute data field that is used to describe the incident, and/or the like In some embodiments, one or more data objects 406 associated with the incident are identified, based on the one or more incident features 404. In some embodiments, relation data 414 is generated based on the one or more data objects 406 and using a connected data graph structure. The relation data 414 may describe relationships between and/or among the one or more data objects 406. In some embodiments, the one or more data objects 406 comprise an affected service data object 408 and one or more connected data objects 410 which may be determined based on the connected data graph structure and/or a service dependency graph structure. In some embodiments, the one or more data objects may comprise a plurality of affected service data objects.

In some embodiments, the one or more data objects 406 are identified by (i) identifying, based on the one or more incident features, the affected service data object 408 and (ii) identifying, based on the affected service data object 408 and using a machine learning model and the connected data graph structure, at least a portion of the one or more connected data objects 410. Alternatively or additionally, in some embodiments, a portion of the one or more connected data objects may be identified using a service dependency graph structure and based on the affected service data object 408. In some embodiments, the connected data graph structure may embody a service dependency graph structure and/or other graph structures (e.g., project to service maps, change to service maps, deployment to service maps, or the like).

In some embodiments, the relation data 414 is generated using one or more machine learning models and based on the affected service data object 408 and the one or more connected data objects 410. For example, the one or more machine learning models may be configured to traverse the connected data graph structure and generate the relation data 414.

In some embodiments, the affected service data object is a service data object originating from a first source (e.g., JSM by Atlassian, JSW by Atlassian, etc.). In some embodiments, an affected service data object is a service data object associated with an incident. For example an affected service data object may comprise one of one or more service data objects, where collaboration between and/or among the one or more service data objects is faulty causing some feature of a software application associated with the one or more service data objects to be degraded.

In some embodiments, a connected data object is a data object that is related to, connected to, or otherwise associated directly or indirectly with an affected service data object. For example, a connected data object may describe a data object that has a relationship with an affected service data object. Examples of a connected data object include a project data object that is associated with an affected service data object, an issue data object that is associated with an affective service data object, a code deployment data object associated with an affected service data object, a code modification data object associated with an affected service data object, a service data object that is, indirectly or directly, connected or otherwise associated with an affected service data object, or the like (e.g., as determined based on a connected data graph structure, service dependency data structure, and/or the like). For example, the one or more connected data objects may include service data objects originating from one or more other sources (e.g., JSW by Atlassian), one or more alert data objects originating from the first source, one or more alert data objects originating from one or more other sources, one or more post-incident reports originating from the first source, one or more post-incident reports originating from the one or more other sources, one or more project data objects originating from the first source, one or more project data objects origination from one or more other sources, and/or the like.

In some embodiments, a connected data graph structure is a data structure configured to represent relationships between data objects including, but not limited to, relationships between service data objects, relationships between projects and service data objects, relationships between code modification data objects and service data objects, relationships between code deployment data objects and service data objects, relationships between code deployment data objects, relationships between code modification data objects, relationship between code deployment data objects and code modification data objects, and/or the like. For example, a connected data graph structure may comprise a plurality of data objects (e.g., service data object, project data object, code deployment data object, code modification data object, and/or the like) as well as relationship objects that represent networks of communication, data organization, computing devices, data exchanged, the like, or combinations thereof for the plurality of data objects. In some embodiments, data objects in a connected data graph structure are represented by nodes of the connected data graph structure. In some embodiments, relationship objects are represented by edges of the connected data graph structure. In some embodiments, a graphical representation of the connected data graph structure can be, at least partially, rendered via a graphical user interface. The connected data graph structure may comprise one or more weighted graphs, multigraphs, isomorphic graphs, trees, the like, or combinations thereof.

In some embodiments, a service dependency graph structure is a data structure configured to represent dependency relationships between an application and its associated services. For example, a service dependency work graph structure may comprise service objects and service object dependencies that represent networks of communication, data organization, computing devices, data exchanged, the like, or combinations thereof for a plurality of services relied on by an application. In some embodiments, service objects are represented by nodes of the service dependency work graph structure. In some embodiments, service dependency objects are represented by edges of the service dependency work graph structure. In some embodiments, a graphical representation of the service dependency work graph structure can be, at least partially, rendered via a graphical user interface. The service dependency work graph structure can comprise one or more weighted graphs, multigraphs, isomorphic graphs, trees, the like, or combinations thereof.

In some embodiments, a candidate incident mitigation dataset 412 comprising a plurality of candidate incident mitigating predictions is generated based on the relation data 414 and/or topology graph structure 416, and/or historical service-related modification data. In some embodiments, the topology graph structure 416 may be retrieved from a topology repository. In some embodiments, the topology graph structure may include a causal graph of at least the plurality of data objects 406. The candidate incident mitigation dataset 412 may include a plurality of candidate code deployment data objects that correspond to historical code deployments predicted as a possible cause of an incident. Alternatively or additionally, the candidate incident mitigation dataset 412 may include a plurality of candidate code modification data objects that correspond to historical code modifications predicted as a possible cause of an incident.

Figure 5:
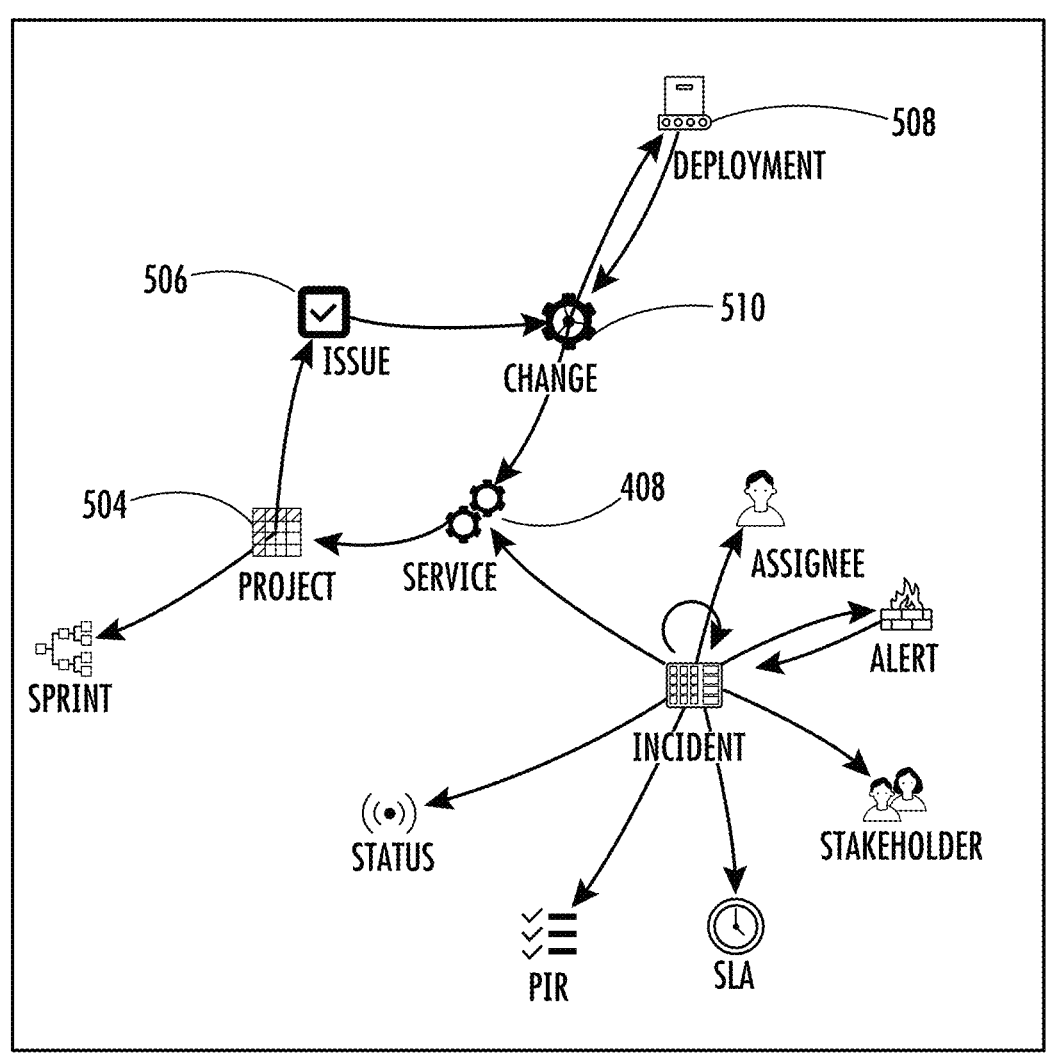
FIG. 5 illustrates a graphical representation of an example relation data in accordance with at least some embodiments of the present disclosure.

FIG. 5 illustrates a graphical representation of an example relation data in accordance with at least some embodiments of the present disclosure. As shown in FIG. 5, the relation data shows connections/relations between a plurality of data objects including the affected service data object 408, and a plurality of connected data objects 410 (e.g., project data object 504, issue data object 506, historical code deployment data object 508, historical code change data object 510, etc.)

As shown in FIG. 4A, in some embodiments, a ranked candidate incident mitigation dataset 418 is generated using one or more ranking models. In some embodiments, the one or more ranking models comprise a learning-to-rank model. In some embodiments, the ranked candidate incident mitigation dataset 418 is generated based on user-generated content 420 and/or usage data 424 associated with the one or more data objects 406 and using the learning-to-rank model. Alternatively or additionally, in some embodiments, the ranked candidate incident mitigation dataset is generated based on incident feedback 422 received from a client computing device and using the learning-to-rank model. For example, in some embodiments, the ranked candidate incident mitigation dataset 418 is generated using the learning-to-rank-model and based on user-generated content 420 associated with the one or more data objects, usage data 424 associated with the one or more data objects 406, and/or incident feedback 422 received from a client computing device. For example, candidate incident mitigation dataset 412, user-generated content 420, usage data 424, and incident feedback 422 may be input to a learning-to-rank model to analyze and/or process the user-generated content 420, usage data 424, and incident feedback 422 with respect to the candidate incident mitigation dataset 412 and generate the ranked candidate incident mitigation dataset 418.

The terms "usage related data," "usage data," or the like refer to a type of data classification that is associated with a data object that contains user or application activity data (e.g., logs for interaction inputs, etc.). For example, the interaction received from a user, via at least a user interface of a computing device, associated with a cloud-based collaboration software can be logged by one or more applications. In some embodiments, the usage related data comprises one or more of direct interaction data, indirect interaction data, audit logs, application logs (i.e., data specific to a particular application, for example biometric data for a medical records software or location data for a mapping application), telemetry data, or the like. In some embodiments, direct interaction data may comprise interaction inputs received from a user, via at least a user interface, into an explicit application interface. For example, direct interaction data may include, without limitation, the number of times a user mouse-clicked on a particular graphical interface element associated with an application. In some embodiments, indirect interaction data may comprise interaction inputs received from a user, via at least a user interface, into a computing device associated with an application. For example, indirect interaction data may include, without limitation, the amount of time a user spends viewing particular application content (e.g., a mandatory employee training manual posted by a manager to a cloud-based collaboration software, etc.).

In some embodiments, one or more incident mitigating predictions 426 from the ranked candidate incident mitigation dataset is selected based on a rank value associated with each of the one or more incident mitigating predictions. In some embodiments, top-N (e.g., N=1, 5, 20, etc.) ranked incident mitigating predictions from the ranked candidate incident mitigation dataset is selected.

In some embodiments, incident mitigating prediction is a final output of an incident mitigation system. An incident mitigating prediction may describe a suggestion, recommendation, or the like configured to correct an incident, minimize the impact of an incident, prevent the occurrence of subsequent incidents, and/or the like. Examples of an incident mitigating prediction includes code modification recommendations, code deployment modification recommendations, or the like. For example, an incident mitigating prediction may comprise a code deployment data object that correspond to an historical code deployment predicted as a possible cause of an incident, whereby the incident may be mitigated by applying corrective action with respect to the historical code deployment. For example, an incident mitigating prediction may comprise a code modification data object that correspond to an historical code modification predicted as a possible cause of an incident, whereby the incident may be mitigated by applying corrective action with respect to the historical code modification. An incident mitigating prediction may be provided to a user. For examples, an incident mitigating prediction may be included in a user interface rendered on a client computer device.

In some embodiments, an incident mitigation interface is caused to be rendered on a user device display, where the incident mitigation interface comprises at least a portion of the selected one or more incident mitigating predictions.

Figure 4B:
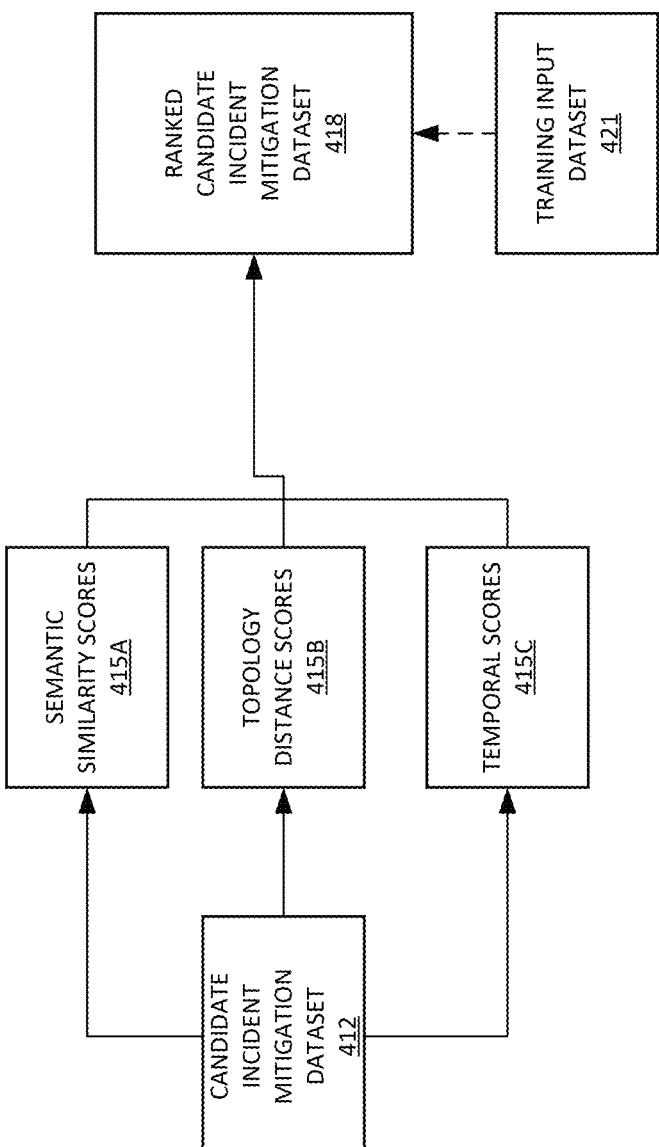
FIG. 4B illustrate a visualization of an example data environment for ranking candidate incident mitigation predictions in accordance with at least some embodiments of the present disclosure.
Figure 4B:
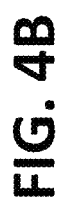

FIG. 4B illustrates a visualization of an example data environment for ranking incident mitigating predictions in accordance with at least some embodiments of the present disclosure. As shown in FIG. 4B, in some embodiments a candidate incident mitigation dataset 412 is determined as described above with reference to FIG. 4A. In some embodiments, the candidate incident mitigation dataset 412 includes a plurality of candidate code deployment data objects for an incident comprising an affected service data object. Alternatively or additionally, in some embodiments, the candidate incident mitigation dataset 412 includes a plurality of candidate code modification data objects for the incident.

In some embodiments, a ranking framework is applied to the candidate incident mitigation dataset 412 to generate a ranked candidate incident mitigation dataset 418. In some embodiments, as described above, the ranking framework includes programmatically generating a semantic similarity score for each candidate code deployment data object and/or candidate code modification data object, generating a topological distance score for each candidate code deployment data object and/or candidate code modification data object, and/or generating a temporal score for candidate code deployment data object and/or candidate code modification data object, and ranking the candidate code deployment data objects and/or candidate code modification data objects based on the scores.

In some embodiments, and as shown in FIG. 4B, for each candidate code deployment data object of the plurality of candidate code deployment data objects in the candidate incident mitigation dataset 412, a semantic similarity score 415A is generated for the candidate code deployment data object and/or candidate code modification data object using a machine learning model and based on the affected service data object. The semantic similarity score may describe a similarity between the candidate incident-causing deployment/event (e.g., candidate code deployment data object and/or candidate code modification data object) and the incident based on semantics.

In some embodiments, the semantic similarity score for a candidate code deployment data object is generated based on a code deployment description feature associated with the candidate code deployment data object and incident description feature associated with the incident data object corresponding to the incident. For example, the description of the code deployment data object may be extracted from the description attribute field of the code deployment data object as a code deployment description feature associated with the code deployment data object using a feature extraction model and a description of the incident may be extracted from the description attribute field of the incident data object associated with the incident as an incident description feature associated with the incident data object using a feature extraction model. The semantic similarity score may then be generated for the pair comprising the code deployment description feature and the incident description feature.

In some embodiments, the semantic similarity score for a candidate code modification data object is generated based on a code modification description feature associated with the candidate code deployment data object and incident description feature associated with the incident data object corresponding to the incident. For example, the description attribute of the code modification data object may be extracted from the description attribute field of the code modification data object as a code modification description feature associated with the code modification data object using a feature extraction model and a description of the incident may be extracted from the description attribute field of the incident data object associated with the incident as an incident description feature associated with the incident data object using a feature extraction model. The semantic similarity score may then be generated for the pair comprising the code modification description feature and the incident description feature.

One or more of a variety of techniques may be leveraged to generate semantic similarity scores. Examples of such techniques include, but not limited, to cosine similarity, Euclidean similarity, or the like. In some embodiments, the semantic similarity score for a candidate code deployment data object and/or for a candidate code modification data object is generated using an LLM.

In some embodiments, for each candidate code deployment data object of the plurality of candidate code deployment data objects in the candidate incident mitigation dataset 412, a topological distance score 415B is generated for the candidate code deployment data object using a topological graph structure associated with the affected service data object and the candidate code deployment data object. In some embodiments the topological distance score for a candidate code deployment data object is generated by traversing the topological graph structure and determining a distance between a first node associated with the candidate code deployment data object and second node associated with the affected service data object. In some embodiments, a machine learning model may be leveraged to traverse the topological graph structure and output the topological distance between a pair comprising the candidate code deployment data object and the affect service data object.

In some embodiments, for each candidate code deployment data object and/or candidate code modification data objects in the candidate incident mitigation dataset 412, a temporal score 415C is generated based on a timestamp associated with the candidate code deployment data object and/or candidate code modification data object and the timestamp associated with the incident. In some embodiments, the timestamp associated with incident comprise the current timestamp. For example, a timestamp associated with a candidate code deployment data object may be compared to a current timestamp to generate a temporal score for the candidate code deployment data object. As another example, a candidate code modification data object may be compared to a current timestamp to generate a temporal score for the candidate code modification data object. Temporal candidate score, for example, may describe the proximity of a candidate code deployment data object and/or a candidate code modification data object to the current timestamp. In some embodiments, a candidate code deployment data object and/or a candidate code modification data object is assigned to a temporal bin based on the temporal score. For example each bin may be configured to x days. For example, bin 1 (e.g., a first bin) may comprise [T0, T0-x], bin 2 (e.g., a second bin) may comprise [T0-x, T0-2x,], etc. In some embodiments, the bins are associated with a progressively lower weight till the older bin. For example, if a bin is i intervals away from the current bin, the weight for the bin may be determined by the equation bin weight=(1−i/n).

In some embodiments, the plurality of candidate code deployment data objects and/or candidate code modification data objects in the candidate incident mitigation dataset 412 are ranked using a ranking model and based on (i) the semantic similarity score, (ii) the topological distance score, and/or (iii) the temporal score for each candidate code deployment data object to generate a ranked candidate incident mitigation dataset 418 (as described above). For example, the sets of semantic similarity score, topological distance score, and temporal score for each candidate code deployment data object and/or candidate code modification data object in a candidate incident mitigation dataset 412 may be compared to generate the ranked candidate incident mitigation dataset comprising the plurality of candidate code deployment data objects and/or candidate mitigation dataset along associated with a rank value. In some embodiments, each of the semantic similarity score measure, topological distance score measure, and temporal score measure may be associated with a weight value that influences the ranking output (e.g., of the ranking model).

For example, for a first candidate code deployment data object (r1) having a semantic similarity score of 0.8, topological distance score of 2, and a temporal score of t-1; a second candidate code deployment data object (r2) having a semantic similarity score of 0.9, topological distance score of 0, and a temporal score of t-2; a third candidate code deployment data object (r3) having a semantic similarity score of 0.8, topological distance score of 1, and a temporal score of t-1; and a fourth candidate code deployment data object (r4) having a semantic similarity score of 0.8, topological distance score of 1, and a temporal score of t-2, the candidate code deployment data objects may be ranked in the order r2, r3, r4, r1, where r2 is ranked higher relative to the other candidate code deployment data objects (e.g., r1, r2, and r3). In the illustrated example, r2 may be ranked higher based on having a higher semantic similarity score. For example, in the illustrated embodiment, semantic similarity score measure may be associated with a higher weight compared to the topological distance score measures and the temporal score measures. In the illustrated example, r3 may be ranked higher than r4 based on the temporal scores for r3 and r4 given that the similarity scores and topological distance scores are the same for r3and r4. Further, in the illustrated example, r1 may be ranked lower based on the topological distance being lower relative to the other candidate code deployment data objects.

In some embodiments, the ranking model (e.g., weights thereof) may be finetuned based on training input dataset 421 to, for example, improve the accuracy of the learning-to-rank model. For example, the ranking module (which may comprise a learning-to-rank model) may be finetuned by modifying, based on the training input dataset 421, initial weights associated with a semantic similarity score parameter, a topological distance score parameter, and a topological distance score parameter associated with the learning-to-rank model. The training input dataset 421 may comprise user feedback with respect to historical incident mitigating predictions and/or historical incidents. For example, the user feedback may comprise explicit feedback from a user (e.g., alert manager, incident manager, and/or the like) and/or implicit feedback obtained from a communication platform, post-incident report, and/or other user-generated content source.

Example Interfaces

Figure 6:
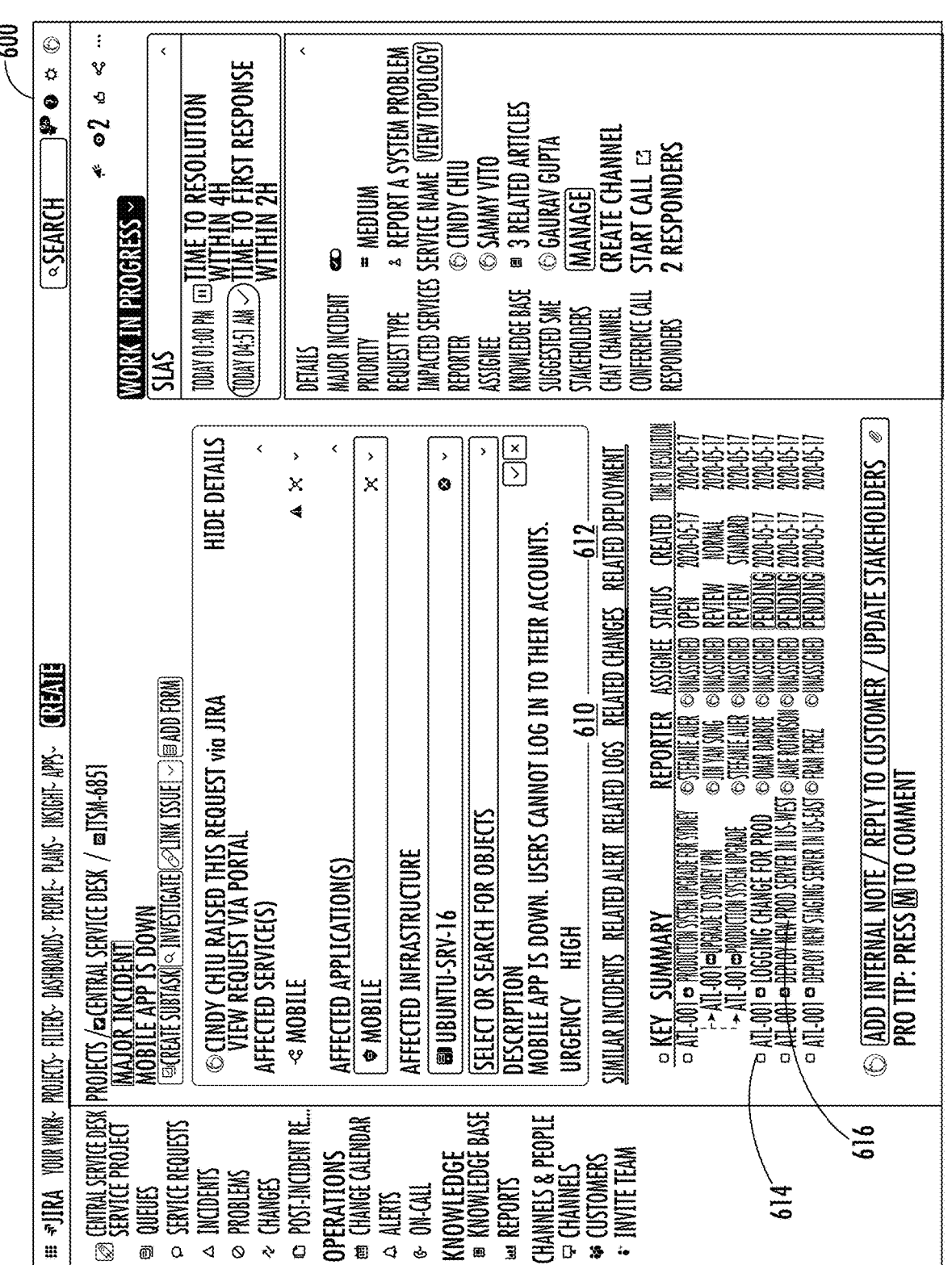
FIG. 6 illustrates an example incident mitigation interface configured in accordance with at least some embodiments of the present disclosure.

FIG. 6, depicts an example incident mitigation interface 600 configured in accordance with at least some embodiments of the present disclosure. The depicted incident mitigation interface 600 comprises one or more incident mitigating prediction components, including, but not limited to code change engagement component 610 and a deployment engagement component 612. The code change engagement component 610 may be configured to, when engaged by a user, cause rendering of an incident-mitigation change component 614 (e.g., as shown in FIG. 6) that visually displays one or more predicted incident-mitigating code modifications 616. The deployment engagement component 612 may be configured to, when engaged by a user, cause rendering of an incident-mitigating deployment component that visually displays one or more predicted incident-mitigating deployments.

Figure 7:
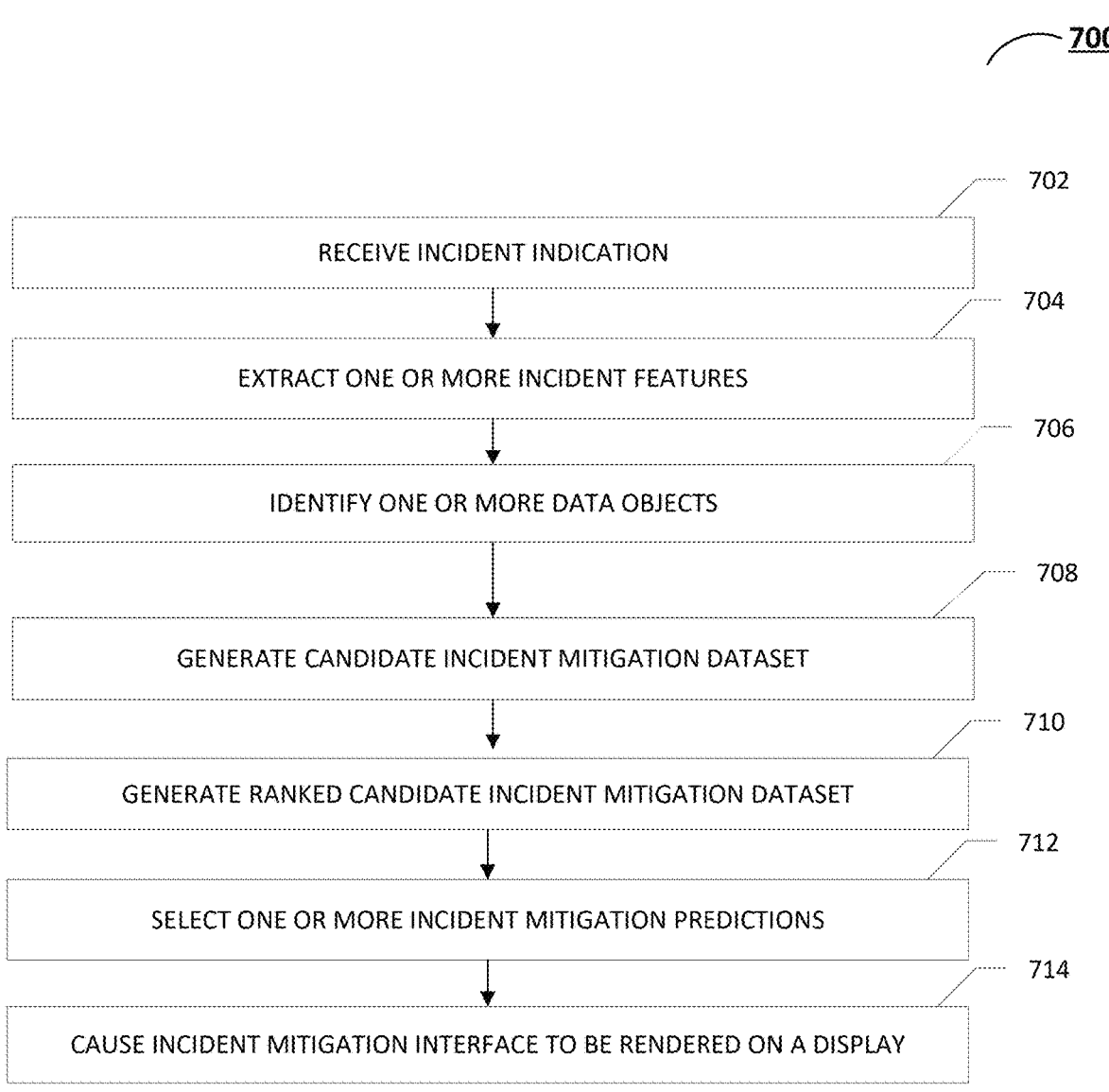
FIG. 7 is a flowchart diagram of an example process for generating incident mitigating predictions in accordance with some embodiments discussed herein.

FIG. 7 is a flowchart diagram of an example process 700 for generating incident mitigating predictions in accordance with some embodiments discussed herein. The process 700 may be implemented by one or more computing devices, entities, and/or systems described herein. For example, via the various steps/operations of the process 700, the apparatus 200 may leverage various techniques, including one or more machine learning techniques, for generating incident mitigating predictions.

FIG. 7 illustrates an example process 700 for explanatory purposes. Although the example process 700 depicts a particular sequence of steps/operations, the sequence may be altered without departing from the scope of the present disclosure. For example, some of the steps/operations depicted may be performed in parallel or in a different sequence that does not materially impact the function of the process 700. In other examples, different components of an example device or system that implements the process 700 may perform functions at substantially the same time or in a specific sequence.

In some embodiments, the process 700 includes at step/operation 702, receiving an incident indication. For example, the apparatus 200 may receive an incident indication associated with an incident. In some embodiments, the incident indication is received from a client computing device. In some embodiments, receiving the incident indication comprises receiving an incident mitigation request from a client computing device.

In some embodiments, the process 700 includes at step/operation 704, extracting one or more incident features. For example, the apparatus 200 may extract one or more incident features associated with the incident. In some embodiments, the one or more incident features is extracted using a feature extraction model and based on an incident data object associated with the incident.

In some embodiments, the process 700 includes at step/operation 706, identifying one or more data objects associated with the incident. For example, the apparatus 200 may identify, based on the one or more incident features, one or more data objects. In some embodiments, the one or more data objects comprise an affected service data object and one or more connected data objects. In some embodiments, the one or more data objects are identified by identifying, based on the one or more incident features, the affected service data object and identifying, using one or more machine learning models and based on the affected service data object, at least a portion of the one or more connected data objects. Alternatively or additionally, in some embodiments, at least a portion of the one or more connected data objects is identified using a service dependency graph structure and based on the affected service data object. In some embodiments, the affected service data object is a service data object originating from a first source (e.g., JSM by Atlassian, etc.). In some embodiments, the one or more connected data objects includes service data objects originating from one or more other sources (e.g., JSW by Atlassian), one or more alert data objects originating from the first source, one or more alert data objects originating from one or more other sources, one or more post-incident reports originating from the first source, one or more post-incident reports originating from the one or more other sources, one or more project data objects originating from the first source, one or more project data objects origination from one or more other sources, and/or the like.

In some embodiments, the process 700 includes at step/operation 708, generating a candidate incident mitigation dataset. For example, the apparatus 200 may generate a candidate incident mitigation dataset comprising a plurality of incident mitigating predictions based on relation data and topology graph structure associated with the one or more data objects. In some embodiments, the relation data is generated using one or more machine learning models and based on the affected service data object and the one or more connected data objects.

In some embodiments, the process 700 includes at step/operation 710, generating a ranked candidate incident mitigation dataset. For example, the apparatus 200 may generate a ranked candidate incident mitigation dataset using one or more ranking models. In some embodiments, the one or more ranking models comprise a learning-to-rank model. In some embodiments, the ranked candidate incident mitigation dataset is generated based on user-generated content associated with the one or more data objects and using the learning-to-rank model. Alternatively or additionally, in some embodiments, the ranked candidate incident mitigation dataset is generated based on incident feedback received from a client computing device and using the learning-to-rank model. For example, in some embodiments, the ranked candidate incident mitigation dataset is generated using the learning-to-rank-model and based on user-generated content associated with the one or more data objects and incident feedback received from a client computing device. For example, the candidate incident mitigation dataset, user-generated content, and incident feedback may be input to a learning-to-rank model to analyze the user-generated content and incident feedback with respect to the candidate incident mitigation dataset and generate the ranked candidate incident mitigation dataset.

In some embodiments, the process 700 includes at step/operation 712, selecting one or more incident mitigating predictions. For example, the apparatus 200 may select one or more incident mitigating predictions from the ranked candidate incident mitigation dataset based on a rank value associated with each of the one or more incident mitigating predictions.

In some embodiments, the process 700 includes at step/operation 714, causing an incident mitigation interface to be rendered on a display. For example, the apparatus 200 may cause an incident mitigation interface to be rendered on a display of a client computing device, where the incident mitigation interface comprises at least a portion of the selected one or more incident mitigating predictions.

FIG. 8 is a flowchart diagram of an example process for identifying potential incident-causing deployments in accordance with some embodiments discussed herein. Specifically, FIG. 8 provides a flowchart diagram of an example process 800 for identifying potential incident-causing deployments by ranking candidate code deployment data objects and/or candidate code modification data objects. The process 800 may be implemented by one or more computing devices, entities, and/or systems described herein. For example, via the various steps/operations of the process 800, the apparatus 200 may leverage various techniques, including one or more machine learning techniques, for identifying potential incident-causing deployments by ranking candidate code deployment data objects and/or candidate code modification data objects.

FIG. 8 illustrates an example process 800 for explanatory purposes. Although the example process 800 depicts a particular sequence of steps/operations, the sequence may be altered without departing from the scope of the present disclosure. For example, some of the steps/operations depicted may be performed in parallel or in a different sequence that does not materially impact the function of the process 800. In other examples, different components of an example device or system that implements the process 800 may perform functions at substantially the same time or in a specific sequence.

In some embodiments, the process 800 includes at step/operation 802, identifying a plurality of candidate code deployment data objects and/or candidate code modification data objects in a candidate incident mitigation dataset. For example, the apparatus 200 may identify a plurality of candidate code deployment data objects and/or candidate code modification data objects for an incident comprising an affected service data object. For example, in some embodiments, the candidate incident mitigation dataset may comprise only candidate code deployment data objects. As another example, in some embodiments, the candidate incident mitigation dataset may comprise only candidate code modification data objects. As yet another example, in some embodiments, the candidate incident mitigation dataset may comprise one or more candidate code modification data objects and one or more candidate code deployment data objects.

In some embodiments, the process 800 includes at step/operation 804, generating a set of ranking scores. For example, the apparatus 200 may generate a set of ranking scores for each candidate code deployment data object and/or candidate code modification data object identified in step/operation 804. For example, the apparatus 200 may generate a semantic similarity score for each candidate deployment data object and/or candidate code modification data object using a machine learning model and based on the affected service data object. The apparatus 200 may generate a topological distance score for each candidate code deployment data object and/or candidate code modification data object using a topological graph structure associated with the affected service data object and the candidate code deployment data object or the candidate code modification data object. The apparatus 200 may generate a temporal score for each candidate code deployment data object and/or each candidate code modification data object based on a timestamp associated with the incident. In some embodiments, the timestamp comprise the current timestamp.

In some embodiments, the process 800 includes at step/operation 806, ranking the plurality of candidate code deployment data objects and/or candidate code modification data objects based on the set of ranking scores. For example, the apparatus 200 may rank the plurality of candidate deployment data objects and/or candidate code modification data objects using a ranking model and based on (i) the semantic similarity score, (ii) the topological distance score, and (iii) the temporal score for each candidate deployment data object to generate a ranked candidate incident mitigation dataset.

In some embodiments, the process 800 includes at step/operation 808, identifying potential incident-causing deployments based on the ranked candidate incident mitigation dataset. For example, the apparatus 200 may identify potential incident-causing deployments by selecting the top N-ranked data objects (e.g., top N-ranked candidate code deployment data objects and/or candidate code modification data objects) in the ranked candidate incident mitigation dataset, as potential incident-causing deployments for the incident. For example, N may be 5, 20, 100, or the like.

In some embodiment, the process 800 includes at step/operation 810 causing rendering of a user interface comprising at least a portion of the ranked candidate incident mitigation dataset. For example, the apparatus may cause rendering of a user interface comprising at least a portion of the ranked candidate incident mitigation dataset corresponding to the identified incident-causing deployments (e.g., top N-ranked candidate code deployment data objects and/or candidate code modification data objects).

Additional Implementation Details

Although example processing systems have been described in the figures herein, implementations of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more modules of computer program instructions, encoded on computer-readable storage medium for execution by, or to control the operation of, information/data processing apparatus. Alternatively, or in addition, the program instructions can be encoded on an artificially-generated propagated signal, e.g., a machine-generated electrical, optical, or electromagnetic signal, which is generated to encode information/data for transmission to suitable receiver apparatus for execution by an information/data processing apparatus. A computer-readable storage medium can be, or be included in, a computer-readable storage device, a computer-readable storage substrate, a random or serial access memory array or device, or a combination of one or more of them. Moreover, while a computer-readable storage medium is not a propagated signal, a computer-readable storage medium can be a source or destination of computer program instructions encoded in an artificially-generated propagated signal. The computer-readable storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (Application Specific Integrated Circuit). The apparatus can also include, in addition to hardware, code that creates a limited interaction mode and/or a non-limited interaction mode for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing, and grid computing infrastructures.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or information/data (e.g., one or more scripts stored in a markup language page), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory, a random-access memory, or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto-optical disks, or optical disks. However, a computer need not have such devices. Devices suitable for storing computer program instructions and information/data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, e.g., a CRT (cathode ray tube) or LCD (liquid crystal display) monitor, for displaying information/data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending pages to and receiving pages from a device that is used by the user; for example, by sending web pages to a web browser on a user's query-initiating computing device in response to requests received from the web browser.

Embodiments of the subject matter described herein can be implemented in a computing system that includes a back-end component, e.g., as an information/data server, or that includes a middleware component, e.g., an application server, or that includes a front-end component, e.g., a query-initiating computing device having a graphical user interface or a web browser through which a user can interact with an implementation of the subject matter described herein, or any combination of one or more such back-end, middleware, or front-end components. The components of the system can be interconnected by any form or medium of digital information/data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits information/data (e.g., an HTML page) to a query-initiating computing device (e.g., for purposes of displaying information/data to and receiving user input from a user interacting with the query-initiating computing device). Information/data generated at the query-initiating computing device (e.g., a result of the user interaction) can be received from the query-initiating computing device at the server.

While this specification contains many specific implementation details, these should not be construed as limitations on the scope of any inventions or of what may be claimed, but rather as description of features specific to particular embodiments of particular inventions. Certain features that are described herein in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in incremental order, or that all illustrated operations be performed, to achieve desirable results, unless described otherwise. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or incremental order, to achieve desirable results, unless described otherwise. In certain implementations, multitasking and parallel processing may be advantageous.

Conclusion

Many modifications and other embodiments of the disclosures set forth herein will come to mind to one skilled in the art to which these disclosures pertain having the benefit of the teachings presented in the foregoing description and the associated drawings. Therefore, it is to be understood that the disclosures are not to be limited to the specific embodiments disclosed and that modifications and other embodiments are intended to be included within the scope of the appended claims. Although specific terms are employed herein, they are used in a generic and descriptive sense only and not for purposes of limitation, unless described otherwise.

That which is claimed is:

1. An apparatus for generating incident mitigating predictions, the apparatus comprising at least one processor and at least one memory including program code, the at least one memory and the program code configured to, with the at least one processor, cause the apparatus to at least:

receive an incident indication for an incident;

extract one or more incident features associated with the incident;

identify, based on the one or more incident features, one or more data objects associated with the incident;

generate, based on relation data and a topology graph structure associated with the one or more data objects, candidate incident mitigation dataset comprising a plurality of incident mitigating predictions;

generate, using one or more ranking models, a ranked candidate incident mitigation dataset;

select one or more incident mitigating predictions from the ranked candidate incident mitigation dataset based on a rank value associated with each of the one or more incident mitigating predictions; and cause rendering of an incident mitigation interface to a user device display, wherein the incident mitigation interface comprises at least a portion of the one or more incident mitigating predictions, and the one or more incident mitigating predictions comprises one or more code deployment modification recommendations.

2. The apparatus of claim 1, wherein the one or more data objects comprise an affected service data object and one or more connected data objects.

3. The apparatus of claim 2, wherein the at least one memory and the program code are configured to, with the at least one processor, to cause the apparatus to identify the one or more data objects by:

identifying, based on the one or more incident features, the affected service data object; and identifying, using a one or more machine learning models and based on the affected service data object, at least a portion of the one or more connected data objects.

4. The apparatus of claim 2, wherein the at least one memory and the program code are configured to, with the at least one processor, to cause the apparatus to identify the one or more data objects by:

identifying, based on the one or more incident features, the affected service data object; and identifying, using a service dependency graph structure and based on the affected service data object, at least a portion of the one or more connected data objects.

5. The apparatus of claim 2, wherein the at least one memory and the program code are further configured to, with the at least one processor, cause the apparatus to:

generate, using one or more machine learning models and based on the affected service data object and the one or more connected data objects, the relation data.

6. The apparatus of claim 1, wherein the one or more ranking models comprise a learning-to-rank model.

7. The apparatus of claim 6, wherein the at least one memory and the program code are configured to, with the at least one processor, cause the apparatus to generate the ranked candidate incident mitigation dataset based on user-generated content associated with the one or more data objects and using the learning-to-rank model.

8. The apparatus of claim 1, wherein the at least one memory and the program code are configured to, with the at least one processor, cause the apparatus to further generate the ranked candidate incident mitigation dataset based on incident feedback received from a client computing device.

9. The apparatus of claim 1, wherein the at least one memory and the program code are configured to, with the at least one processor, to cause the apparatus to extract the one or more incident features using a feature extraction model and based on an incident data object associated with the incident.

10. A computer-implemented method for generating incident mitigating predictions, the computer-implemented method comprising:

receiving an incident mitigation request for an incident;

extracting one or more incident features associated with the incident;

identifying, based on the one or more incident features, one or more data objects associated with the incident;

generating, based on relation data, topology graph structure, and historical service-related modifications associated with the one or more data objects, candidate incident mitigation dataset comprising a plurality of incident mitigating predictions;

generating, using one or more ranking models, a ranked candidate incident mitigation dataset;

selecting one or more incident mitigating predictions from the ranked candidate incident mitigation dataset based on a rank value associated with each of the one or more incident mitigating predictions; and causing rendering of an incident mitigation interface to a user device display, wherein the incident mitigation interface comprises at least a portion of the one or more incident mitigating predictions, and the one or more incident mitigating predictions comprises one or more code deployment modification recommendations.

11. The computer-implemented method of claim 10, wherein the one or more data objects comprise an affected service data object and one or more connected data objects.

12. The computer-implemented method of claim 11, wherein identifying the one or more data objects comprises:

identifying, based on the one or more incident features, the affected service data object; and identifying, using a one or more machine learning models and based on the affected service data object, at least a portion of the one or more connected data objects.

13. The computer-implemented method of claim 11, wherein identifying the one or more data objects comprises:

identifying, based on the one or more incident features, the affected service data object; and identifying, using a service dependency graph structure and based on the affected service data object, at least a portion of the one or more connected data objects.

14. The computer-implemented method of claim 11, further comprising:

generating, using one or more machine learning models and based on the affected service data object and the one or more connected data objects, the relation data.

15. The computer-implemented method of claim 10, wherein the one or more ranking models comprise a learning-to-rank model.

16. The computer-implemented method of claim 15, wherein generating the ranked candidate incident mitigation dataset further comprises generated the ranked candidate incident mitigation dataset based on user-generated content associated with the one or more data objects and using the learning-to-rank model.

17. The computer-implemented method of claim 10, wherein generating the ranked candidate incident mitigation dataset further comprises generating the ranked candidate incident mitigation dataset based on incident feedback received from a client computing device.

18. At least one non-transitory computer-readable storage medium for generating incident mitigating predictions, the at least one non-transitory computer-readable storage medium having computer coded instructions configured to, when executed by at least one processor:

receive an incident indication for an incident;

identify, based on one or more incident features of the incident, one or more data objects associated with the incident;

generate, based on topology graph structure and historical service-related modifications associated with the one or more data objects, candidate incident mitigation dataset comprising a plurality of incident mitigating predictions;

generate, using a learning-to-rank-model, a ranked candidate incident mitigation dataset;

select one or more incident mitigating predictions from the ranked candidate incident mitigation dataset based on a rank value associated with each of the one or more incident mitigating predictions; and cause rendering of an incident mitigation interface to a user device display, wherein the incident mitigation interface comprises at least a portion of the one or more incident mitigating predictions, and the one or more incident mitigating predictions comprises one or more code deployment modification recommendations.

\* \* \* \* \*